US009550699B2

United States Patent
Moteki et al.

(10) Patent No.: US 9,550,699 B2
(45) Date of Patent: Jan. 24, 2017

(54) CERAMIC COMPOSITION AND CUTTING TOOL

(71) Applicant: NGK SPARK PLUG CO., LTD., Nagoya, Aichi (JP)

(72) Inventors: Jun Moteki, Inuyama (JP); Yusuke Katsu, Komaki (JP); Takeshi Mitsuoka, Konan (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 14/419,511

(22) PCT Filed: Dec. 27, 2013

(86) PCT No.: PCT/JP2013/007683
§ 371 (c)(1),
(2) Date: Feb. 4, 2015

(87) PCT Pub. No.: WO2015/019391
PCT Pub. Date: Feb. 12, 2015

(65) Prior Publication Data
US 2016/0023952 A1 Jan. 28, 2016

(30) Foreign Application Priority Data
Aug. 8, 2013 (JP) .................................. 2013-164637

(51) Int. Cl.
*C04B 35/10* (2006.01)
*C04B 35/56* (2006.01)
(Continued)

(52) U.S. Cl.
CPC ............. *C04B 35/10* (2013.01); *C04B 35/119* (2013.01); *C04B 35/5626* (2013.01);
(Continued)

(58) Field of Classification Search
CPC ...... C04B 35/10; C04B 35/111; C04B 35/119; C04B 35/117
See application file for complete search history.

(56) References Cited

U.S. PATENT DOCUMENTS 4,366,254 A * 12/1982 Rich ..................... C04B 35/645
501/105
5,916,833 A  6/1999 Susuki et al.
(Continued)

FOREIGN PATENT DOCUMENTS

JP  5-279121 A  10/1993
JP  5-319910 A  12/1993
(Continued)

OTHER PUBLICATIONS

International Search Report for PCT/JP2013/007683 dated Apr. 8, 2014 [PCT/ISA/210].
(Continued)

*Primary Examiner* — Karl Group
(74) *Attorney, Agent, or Firm* — Sughrue Mion, PLLC

(57) ABSTRACT

In a ceramic composition mainly composed of alumina ($Al_2O_3$), tungsten carbide (WC) and zirconia ($ZrO_2$), zirconium (Zr) is distributed in a first grain boundary as an interface where an alumina ($Al_2O_3$) crystal grain is adjacent to a tungsten carbide (WC) crystal grain and in a second grain boundary as an interface where two alumina ($Al_2O_3$) crystal grains are adjacent to each other.

6 Claims, 12 Drawing Sheets

(51) Int. Cl.
*C04B 35/119* (2006.01)
*C04B 35/626* (2006.01)
*C04B 35/645* (2006.01)

(52) U.S. Cl.
CPC ...... *C04B 35/62685* (2013.01); *C04B 35/645* (2013.01); *C04B 2235/3206* (2013.01); *C04B 2235/3208* (2013.01); *C04B 2235/3217* (2013.01); *C04B 2235/3224* (2013.01); *C04B 2235/3225* (2013.01); *C04B 2235/3241* (2013.01); *C04B 2235/3244* (2013.01); *C04B 2235/3251* (2013.01); *C04B 2235/3272* (2013.01); *C04B 2235/3839* (2013.01); *C04B 2235/3843* (2013.01); *C04B 2235/3847* (2013.01); *C04B 2235/5436* (2013.01); *C04B 2235/5445* (2013.01); *C04B 2235/80* (2013.01); *C04B 2235/85* (2013.01); *C04B 2235/96* (2013.01); *C04B 2235/9607* (2013.01)

(56) References Cited

U.S. PATENT DOCUMENTS

| | | | |
|---|---|---|---|
| 5,955,390 A | 9/1999 | Mehrotra et al. | |
| 6,133,182 A | 10/2000 | Sasaki et al. | |
| 8,927,447 B2* | 1/2015 | Moteki | C04B 35/106 407/119 |
| 2001/0029230 A1* | 10/2001 | Hatano | C04B 35/117 501/127 |
| 2014/0242383 A1* | 8/2014 | Moteki | C04B 35/106 428/338 |

FOREIGN PATENT DOCUMENTS

| | | |
|---|---|---|
| JP | 6-9264 A | 1/1994 |
| JP | 9-221352 A | 8/1997 |
| JP | 11-217258 A | 8/1999 |
| JP | 2008-105938 A | 5/2008 |
| JP | 2010-235351 A | 10/2010 |
| KR | 10-1999-0067499 | 8/1999 |
| WO | 2014/002743 A1 | 1/2014 |

OTHER PUBLICATIONS

English translation of an Office Action dated Jan. 15, 2016 from the Korean Intellectual Property Office issued in corresponding Korean Application No. 2014-7029425.

* cited by examiner

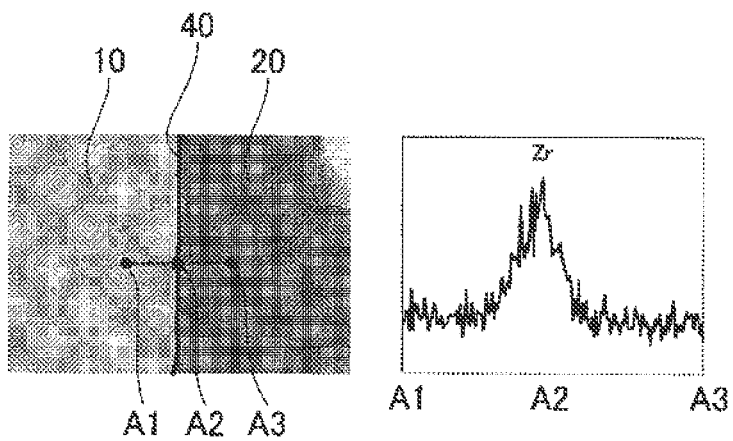
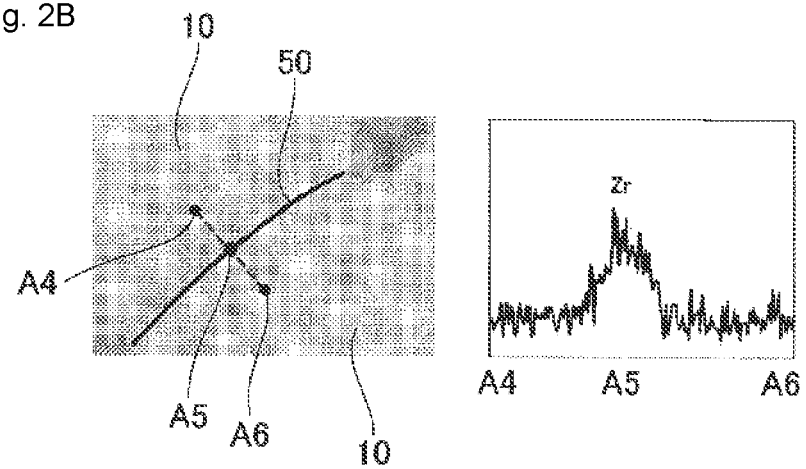

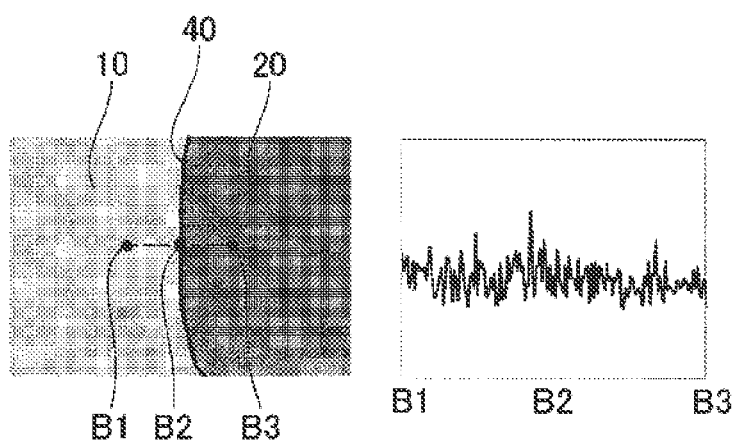
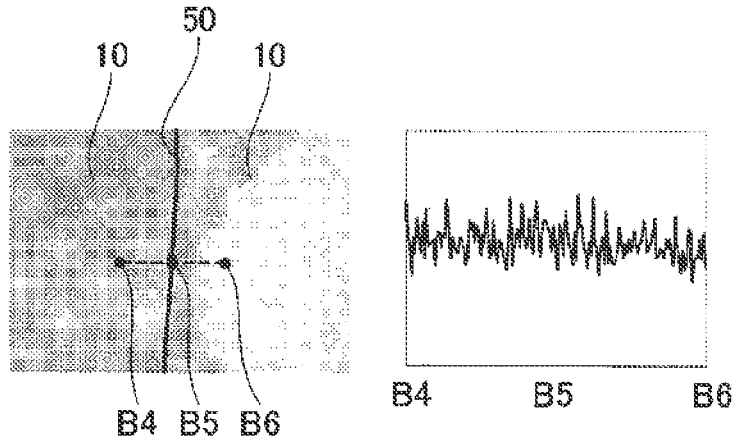

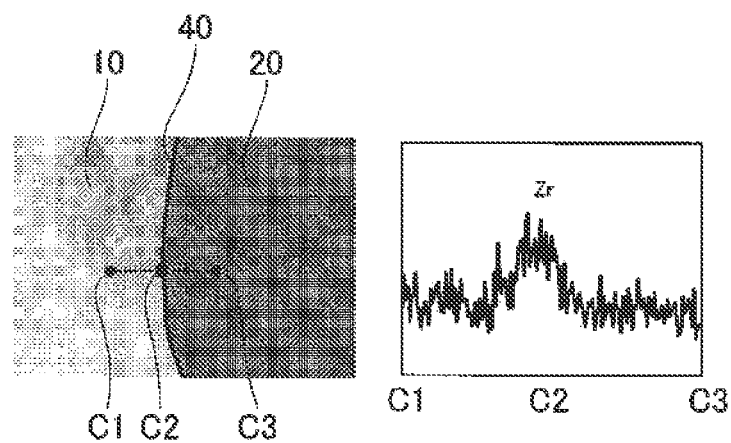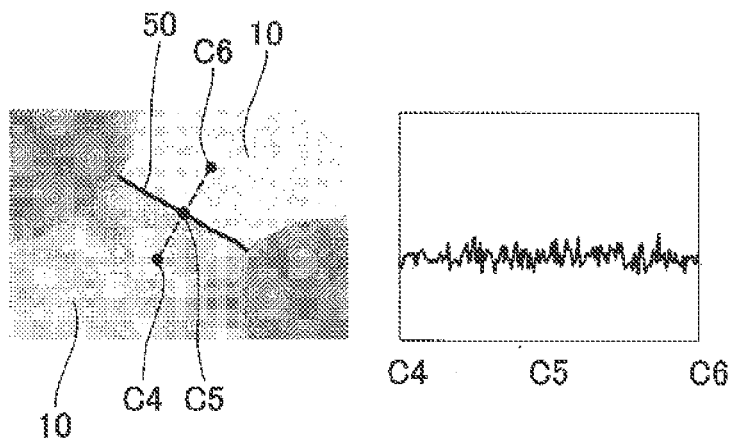

Fig.12

P/NP* : *Performed/ Not Performed  P/NP : Present/ Not Present
P* : *Performed  P : Present
NP : Not Present

| Sample | Composition | | | | | | Amount of Dispersant Added | Sintering Temp | Additional Component Element in Grain Boundary | | Area Ratio A/(A+B) ×100 | Bending Strength span: 30mm | Fracture Toughness $K_{IC}$ | Hardness Vickers | Coefficient of Thermal Expansion at 600°C | Thermal Conductivity at room temperature | Cutting Test 240 m/min 5 passes | | Cutting Test 360 m/min 5 passes | | Cutting Test 480 m/min 5 passes | |
|---|---|---|---|---|---|---|---|---|---|---|---|---|---|---|---|---|---|---|---|---|---|---|
| | $Al_2O_3$ vol% | WC vol% | Additional Component | | | Preliminary Pulverization P/NP* | wt% | °C | $Al_2O_3$/WC P/NP** | $Al_2O_3$/$Al_2O_3$ P/NP** | % | MPa | $MPa \cdot m^{0.5}$ | GPa | ppm/K | W/(m·K) | Cutting edge | Abrasion loss | Cutting edge | Abrasion loss | Cutting edge | Abrasion loss |
| | | | | vol% | Particle Size μm | | | | | | | | | | | | | | | | | |
| 13 | 55.0 | 40.0 | $ZrO_2$ | 5.0 | 0.7 | P* | 2.0 | 1750 | P** | P** | 9.0 | 1810 | 4.6 | 22.2 | 6.4 | 34.4 | O>△>× | O>△>× | O | O | O | O |
| 14 | 59.5 | 40.0 | $Y_2O_3$ | 0.5 | 0.8 | P* | 2.0 | 1750 | P** | P** | 10.1 | 1750 | 4.6 | 22.3 | 6.3 | 36.3 | O | O | O | O | O | O |
| 15 | 59.5 | 40.0 | $Nb_2O_5$ | 0.5 | 0.7 | P* | 2.0 | 1750 | P** | P** | 9.2 | 1690 | 4.7 | 22.1 | 6.3 | 33.5 | O | O | O | O | O | O |
| 16 | 59.5 | 40.0 | $Cr_2O_3$ | 0.5 | 1.1 | P* | 2.0 | 1750 | P** | P** | 11.1 | 1620 | 4.6 | 22.5 | 6.2 | 34.5 | O | O | O | O | O | O |
| 17 | 59.5 | 40.0 | $ZrO_2$ / $Y_2O_3$ | 0.25 / 0.25 | 0.7 / 0.7 | P* | 2.0 | 1750 | P** | P** | 10.6 | 1760 | 4.6 | 22.3 | 6.1 | 36.5 | O | O | O | O | O | O |
| SC15 | 59.5 | 40.0 | $Fe_2O_3$ | 0.5 | 0.9 | P* | 2.0 | 1750 | NP** | NP** | 10.0 | 1000 | 4.6 | 22.1 | 6.5 | 34.2 | × | × | × | × | × | × |
| SC16 | 59.5 | 40.0 | CaO | 0.5 | 1.1 | P* | 2.0 | 1750 | NP** | NP** | 10.0 | 950 | 4.3 | 22.2 | 6.6 | 34.8 | × | × | × | × | × | × |

Fig.13

| Sample | Composition Al₂O₃ vol% | WC vol% | Additional Component | | Particle Size μm | Preliminary Pulverization P/NP* | Amount of Dispersant Added wt% | Sintering Temp °C | Additional Component Element in Grain Boundary Al₂O₃/WC P/NP** | Al₂O₃/Al₂O₃ P/NP** | Area Ratio A/(A+B)×100 % | Bending Strength span:30mm MPa | Fracture Toughness K_IC MPa·m^0.5 | Hardness Vickers GPa | Coefficient of Thermal Expansion at 600°C ppm/K | Thermal Conductivity at room temperature W/(m·K) | Cutting Test 240 m/min 5 passes Cutting edge / Abrasion loss | Cutting Test 360 m/min 5 passes Cutting edge / Abrasion loss | Cutting Test 480 m/min 5 passes Cutting edge / Abrasion loss |
|---|---|---|---|---|---|---|---|---|---|---|---|---|---|---|---|---|---|---|---|
| | | | vol% | | | | | | | | | | | | | | O>△>× | O>△>× | O>△>× |
| A | 59.0 | 40.0 | ZrO₂ 1.0 | 0.7 | | P* | 2.0 | 1750 | P** | P** | 8.6 | 1650 | 4.4 | 22.7 | 6.3 | 34.7 | O | O | O |
| B | 58.3 | 40.0 | ZrO₂ 1.7 | 0.7 | | P* | 2.0 | 1750 | P** | P** | 8.6 | 1720 | 4.5 | 22.8 | 6.3 | 34.7 | O | O | O |
| C | 50.0 | 40.0 | ZrO₂ 10.0 | 0.7 | | P* | 2.0 | 1750 | P** | P** | 9.3 | 1850 | 4.7 | 21.5 | 6.6 | 33.5 | O | O | O |
| D | 59.5 | 40.0 | TiC 0.5 | 0.8 | | P* | 2.0 | 1750 | P** | P** | 10.3 | 1650 | 4.6 | 22.2 | 6.4 | 34.3 | O | O | O |
| E | 59.5 | 40.0 | VC 0.5 | 1.2 | | P* | 2.0 | 1750 | P** | P** | 10.9 | 1690 | 4.6 | 22.6 | 6.4 | 33.6 | O | O | O |
| F | 59.5 | 40.0 | Cr₃C₂ 0.5 | 1.0 | | P* | 2.0 | 1750 | P** | P** | 12.0 | 1660 | 4.6 | 22.4 | 6.3 | 34.0 | O | O | O |
| G | 59.5 | 40.0 | ZrC 0.5 | 1.1 | | P* | 2.0 | 1750 | P** | P** | 10.5 | 1690 | 4.7 | 22.5 | 6.5 | 33.6 | O | O | O |
| H | 59.5 | 40.0 | NbC 0.5 | 1.0 | | P* | 2.0 | 1750 | P** | P** | 11.3 | 1670 | 4.7 | 22.1 | 6.4 | 33.8 | O | O | O |
| I | 59.5 | 40.0 | ZrO₂ 0.25 / ZrC 0.25 | 0.7 / 1.1 | | P* | 2.0 | 1750 | P** | P** | 9.9 / 9.6 | 1700 | 4.6 | 22.4 | 6.5 | 33.2 | O | O | O |
| X | 59.5 | 40.0 | MgO 0.5 | 0.8 | | P* | 2.0 | 1750 | P** | P** | | 1070 | 4.5 | 22.1 | 6.5 | 33.7 | × | × | × |

P/NP* : *Performed / Not Performed  P* : *Performed
P/NP : Present / Not Present  P : Present

US 9,550,699 B2

CERAMIC COMPOSITION AND CUTTING TOOL

CROSS REFERENCE TO RELATED APPLICATIONS

This application is a National Stage of International Application No. PCT/JP2013/007683, filed on Dec. 27, 2013, which claims priority from Japanese Patent Application No. 2013-164637, filed on Aug. 8, 2013, the contents of all of which are incorporated herein by reference in their entirety.

TECHNICAL FIELD

The present invention relates to a ceramic composition and a cutting tool.

BACKGROUND ART

A ceramic composition mainly composed of alumina ($Al_2O_3$) has relatively excellent mechanical properties, reaction resistance and heat resistance and is accordingly used for tools, structural members and structural components. An alumina/tungsten carbide-based ceramic composition is a ceramic composition produced by adding tungsten carbide (WC) to alumina and has more excellent mechanical properties and heat resistance. Accordingly, the alumina/tungsten carbide-based ceramic composition is used for, for example, cutting tools and molds (see, for example, Patent Literatures 1 and 2).

An alumina/tungsten carbide/zirconia-based ceramic composition is a ceramic composition produced by further adding zirconia ($ZrO_2$) to alumina and tungsten carbide and has furthermore excellent mechanical properties. Accordingly, the alumina/tungsten carbide/zirconia-based ceramic composition is usable for, for example, a cutting tool for a heat-resistant alloy that needs further higher impact resistance and heat resistance (see, for example, Patent Literature 3).

A whisker-type ceramic composition is often used for the cutting tool for the heat-resistant alloy. The whisker-type ceramic composition is a ceramic composition produced by adding silicon carbide whisker to alumina. The whisker-type ceramic composition, however, has problems that the silicon carbide whisker used as the raw material is relatively expensive and that careful handling is required to avoid a potential health hazard caused by the silicon carbide whisker of needle crystals. The alumina/tungsten carbide/zirconia-based ceramic composition provides the mechanical properties and the durability substantially equivalent to those of the whisker-type ceramic composition and is additionally superior to the whisker-type ceramic composition in the cost and the low risk of health hazard.

CITATION LIST

Patent Literature

PTL 1: JP H05-279121A
PTL 2: JP H06-009264A
PTL 3: JP H09-221352A

SUMMARY

Technical Problem

The ceramic compositions of Patent Literatures 1 to 3 have the problem that the binding force between the alumina crystal grains is reduced by the tensile residual stress occurring in the alumina crystal grains due to the difference between the coefficients of thermal expansion of alumina and tungsten carbide. Reduction of the binding force between the alumina crystal grains accelerates the development of cracking in the ceramic composition. This deteriorates the mechanical properties of the ceramic composition and results in reducing the durability of the ceramic composition.

Solution to Problem

In order to solve the problems described above, the invention may be implemented by any of the following aspects.

(1) According to one aspect of the invention, there is provided a ceramic composition mainly composed of alumina ($Al_2O_3$), tungsten carbide (WC) and zirconia ($ZrO_2$). In this ceramic composition, zirconium (Zr) is distributed in a first grain boundary as an interface where an alumina ($Al_2O_3$) crystal grain is adjacent to a tungsten carbide (WC) crystal grain and in a second grain boundary as an interface where two alumina ($Al_2O_3$) crystal grains are adjacent to each other. According to this aspect, zirconium (Zr) distributed in the first grain boundary and in the second grain boundary enhances the binding force between the crystal grains in each grain boundary. This accordingly improves the mechanical properties of the alumina/tungsten carbide/zirconia-based ceramic composition and results in improving its durability. The wording of "mainly composed of alumina ($Al_2O_3$), tungsten carbide (WC) and zirconia ($ZrO_2$)" herein means that the ceramic composition contains an inevitable impurity other than alumina, tungsten carbide and zirconia. The "inevitable impurity" is at least one of iron (Fe), chromium (Cr), cobalt (Co) and nickel (Ni) inevitably incorporated in the manufacturing process and is present in such an amount that solid solution of the inevitable impurity in tungsten carbide does not reduce the bending strength, the hardness or the thermal conductivity (for example, not higher than 0.1% by mass).

(2) On a cross section of the ceramic composition described above, a relationship between a cross sectional area A of a tungsten carbide (WC) crystal grain which is not adjacent to another tungsten carbide (WC) crystal grain but is surrounded by at least one type of crystal grain of the alumina ($Al_2O_3$) crystal grain and a zirconia ($ZrO_2$) crystal grain and a cross sectional area B of a tungsten carbide (WC) crystal grain adjacent to another tungsten carbide (WC) crystal grain may satisfy $1.5 \leq A/(A+B) \times 100 \leq 50.0$. This aspect achieves reinforcement of the crystal grains by a compressive residual stress occurring in the tungsten carbide crystal grain surrounded by alumina and/or zirconia having relatively high coefficients of thermal expansion, simultaneously with improvement of thermal conduction by a thermal conduction pathway formed by linkage of the tungsten carbide crystal grains. This aspect accordingly improves the mechanical properties and the heat resistance of the alumina/tungsten carbide/zirconia-based ceramic composition and results in further improving its durability.

(3) In the ceramic composition described above, tungsten carbide (WC) may occupy a part of not lower than 20.0% by volume and not higher than 50.0% by volume, zirconia ($ZrO_2$) may occupy a part of not lower than 0.1% by volume and not higher than 18.0% by volume, and alumina ($Al_2O_3$) may occupy a residual part. This aspect improves the mechanical properties and the heat resistance of the alumina/ tungsten carbide/zirconia-based ceramic composition and results in further improving its durability.

The invention may be implemented by any of various aspects other than the ceramic composition: for example, a cutting tool made of the ceramic composition described above, a mold made of the ceramic composition described above or a manufacturing method of manufacturing the ceramic composition described above.

BRIEF DESCRIPTION OF DRAWINGS

FIGS. 2A and 2B are diagrams illustrating typical grain boundaries of a ceramic composition according to one embodiment;

FIGS. 4A and 4B are diagrams illustrating grain boundaries of a sample SC1;

FIGS. 5A and 5B are diagrams illustrating grain boundaries of a sample SC2;

DESCRIPTION OF REFERENCE NUMERALS

Figure 1A:
FIGS. 1A and 1B are diagrams illustrating a typical structure of a ceramic composition according to one embodiment.

Reference signs used to identify various features in the drawings including the following.
10 Alumina crystal grain
20 Tungsten carbide crystal grain
30 Zirconia crystal grain
40 First grain boundary
50 Second grain boundary
110 Solvent
150 Particle

DESCRIPTION OF EMBODIMENTS

A. Structure of Ceramic Composition

A ceramic composition according to one embodiment of the invention is an alumina/tungsten carbide (WC)/zirconia-based ceramic composition mainly composed of alumina ($Al_2O_3$), tungsten carbide (WC) and zirconia ($ZrO_2$). In the ceramic composition of the embodiment of the invention, zirconium (Zr) is distributed in a first grain boundary as an interface where an alumina ($Al_2O_3$) crystal grain is adjacent to a tungsten carbide (WC) crystal grain and in a second grain boundary as an interface where two alumina ($Al_2O_3$) crystal grains are adjacent to each other.

Figure 1B:
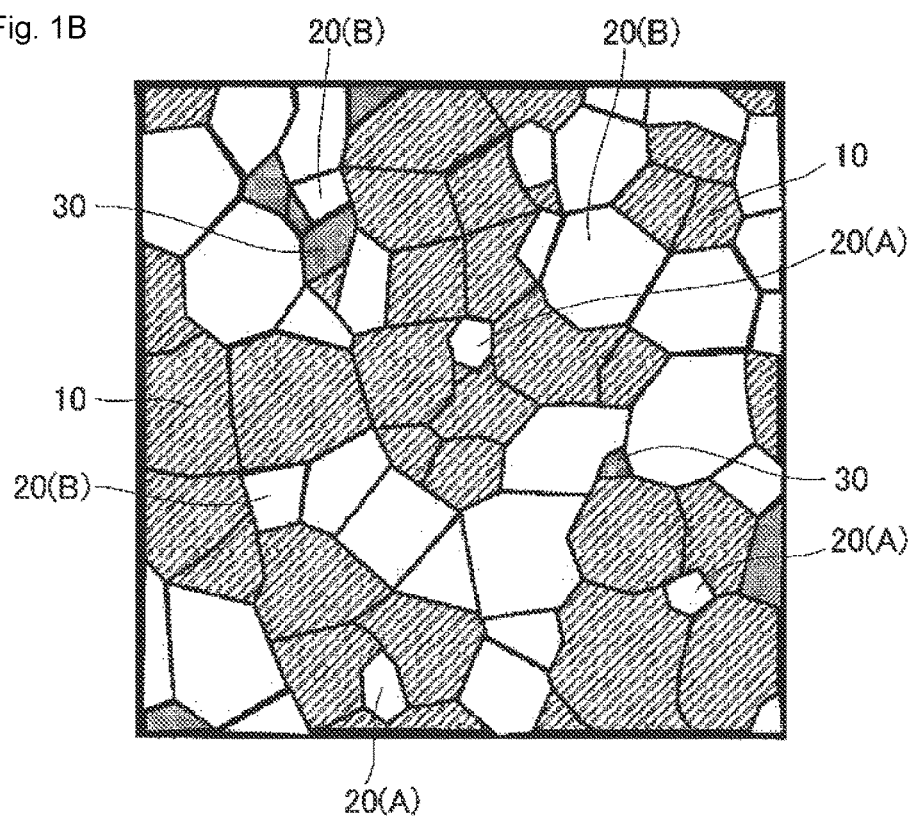

FIGS. 1A and 1B are diagrams illustrating a typical structure of a ceramic composition according to one embodiment. An image shown in FIG. 1A is a scanning electron microscope (SEM) image of an arbitrary surface of a ceramic composition subject to mirror polishing and subsequent thermal etching. An image shown in FIG. 1B is a diagrammatic representation of the crystal grains shown in the image of FIG. 1A. Each side of the images shown in FIGS. 1A and 1B corresponds to the length of 10 μm (micrometer) of the actual ceramic composition.

The ceramic composition of the embodiment is a polycrystalline body and includes a plurality of alumina crystal grains 10, a plurality of tungsten carbide crystal grains 20 and a plurality of zirconia crystal grains 30. The alumina crystal grains 10 are crystal particles made of alumina ($Al_2O_3$). The tungsten carbide crystal grains 20 are crystal particles made of tungsten carbide (WC). The zirconia crystal grains 30 are crystal particles made of zirconia ($ZrO_2$).

The plurality of tungsten carbide crystal grains 20 include tungsten carbide crystal gains 20(A) each of which is not adjacent to another tungsten carbide crystal grain 20 but is surrounded by at least one type of crystal grains of the alumina crystal grains 10 and the zirconia crystal grains 30 and tungsten crystal grains 20(B) each of which is adjacent to another tungsten carbide crystal grain 20. In the description of this embodiment, the code used to denote the tungsten carbide crystal grain is a symbol "20" in the case that the relationship to the surrounding crystal grains is not specified and is symbols "20(A)" and "20(B)" in the case that the relationship to the surrounding crystal grains is specified. The tungsten carbide crystal grain 20(A) is a crystal particle that is not adjacent to another tungsten carbide crystal grain 20. The tungsten carbide crystal grain 20(B) is a crystal particle that is adjacent to one or more other tungsten carbide crystal grains 20.

FIGS. 2A and 2B are diagrams illustrating typical grain boundaries of a ceramic composition according to one embodiment. An image shown on the left side of FIG. 2A is a scanning transmission electron microscope (STEM) image of a first grain boundary 40 which is an arbitrary interface where an alumina crystal grain 10 is adjacent to a tungsten carbide crystal grain 20. An image shown on the right side of FIG. 2A is a graph of the concentration of zirconium (Zr) element in the periphery of the first grain boundary 40 measured by an energy dispersive X-ray spectrometer (EDS).

The abscissa of the graph in FIG. 2A indicates respective positions on a straight line intersecting with the first grain boundary 40 or more specifically a position A1 of the alumina crystal grain 10 through a position A2 on the first grain boundary 40 to a position A3 of the tungsten carbide crystal grain 20. The distance from the position A1 to the position A3 is about 50 nm (nanometer). The ordinate of the graph in FIG. 2A shows the concentration of element zirconium. In the ceramic composition of the embodiment, zirconium (Zr) is distributed in the first grain boundary 40 where the alumina crystal grain 10 is adjacent to the tungsten carbide crystal grain 20.

An image shown on the left side of FIG. 2B is an STEM image of a second grain boundary 50 which is an arbitrary interface where two alumina crystal grains 10 are adjacent to each other. An image shown on the right side of FIG. 2B is a graph of the concentration of element zirconium in the periphery of the second grain boundary 50 measured by EDS. The abscissa of the graph in FIG. 2B indicates respective positions on a straight line intersecting with the second grain boundary 50 or more specifically a position A4 of one alumina crystal grain 10 through a position A5 on the second grain boundary 50 to a position A6 of the other alumina crystal grain 10. The distance from the position A4 to the position A6 is about 50 nm. The ordinate of the graph in FIG. 2B shows the concentration of element zirconium. In the typical ceramic composition of the embodiment, zirconium (Zr) is distributed in the second grain boundary 50 where the two alumina crystal grains 10 are adjacent to each other.

In the ceramic composition of the embodiment, zirconium (Zr) distributed in the first grain boundary 40 and in the second grain boundary 50 enhances the binding force between the crystal grains in each grain boundary. Accordingly this improves the mechanical properties of the alumina/tungsten carbide/zirconia-based ceramic composition and results in improving its durability.

In the ceramic composition of the embodiment, on any cross section of the ceramic composition, it is preferable that the relationship between a cross sectional area A of the tungsten carbide crystal grain 20(A) and a cross sectional area B of the tungsten carbide crystal grain 20(B) satisfies $1.5 \leq A/(A+B) \times 100 \leq 50.0$. This achieves reinforcement of the crystal grains by a compressive residual stress occurring in the tungsten carbide crystal grains 20(A) surrounded by alumina and/or zirconia having relatively high coefficients of thermal expansion, simultaneously with improvement of the thermal conduction by a thermal conduction pathway formed by linkage of the tungsten carbide crystal grains 20(B). Accordingly this improves the mechanical properties and the heat resistance of the alumina/tungsten carbide/zirconia-based ceramic composition and results in further improving its durability.

In the ceramic composition of the embodiment, it is preferable that tungsten carbide (WC) occupies a part of not lower than 20.0% by volume and not higher than 50.0% by volume, zirconia ($ZrO_2$) occupies a part of not lower than 0.1% by volume and not higher than 18.0% by volume, and alumina ($Al_2O_3$) occupies a residual part. This improves the mechanical properties and the heat resistance of the alumina/tungsten carbide/zirconia-based ceramic composition and results in further improving its durability. The ceramic composition of the embodiment preferably has a bending strength (3-point bending strength under the condition of the external span length (span) of 30 mm in conformity with Japanese Industrial Standard (JIS) R 1601) of higher than 1100 MPa and a thermal conductivity (thermal conductivity at room temperature in conformity with JIS R 1611) of higher than 26 W/(m·K).

B. Manufacturing Method of Ceramic Composition

Figure 3:
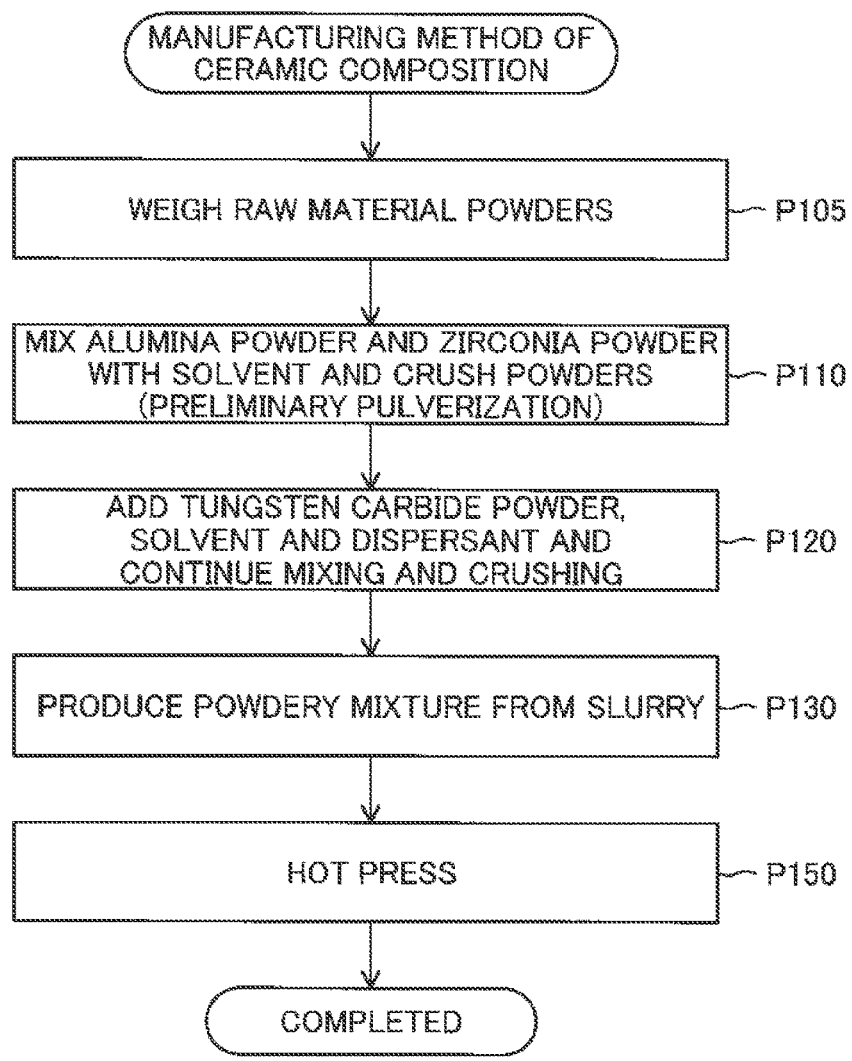
FIG. 3 is a flowchart showing a manufacturing method of the ceramic composition.

FIG. 3 is a flowchart showing a manufacturing method of the ceramic composition. The manufacturing method of FIG. 3 is employed to manufacture the ceramic composition of the embodiment described above. In the procedure of manufacturing the ceramic composition, the manufacturer first weighs alumina powder, tungsten carbide powder and zirconia powder as raw materials of the ceramic composition, respectively (process P105).

Alumina powder having the mean particle size of about 0.5 μm may be used as the raw material of the ceramic composition. The mean particle size of the alumina powder used as the raw material may be less than 0.5 μm or may be greater than 0.5 μm. In the description of this embodiment, the mean particle size of any powder is a value measured using a laser diffraction-type particle size distribution measuring device.

Tungsten carbide powder having the mean particle size of about 0.7 μm may be used as the raw material of the ceramic composition. The mean particle size of the tungsten carbide powder used as the raw material may be less than 0.7 μm or may be greater than 0.7 μm.

Zirconia powder (3YSZ powder) which has the mean particle size of about 0.7 μm and is partly stabilized with 3 mol % (mole percent) yttria ($Y_2O_3$) as a stabilizing agent may be used as the raw material of the ceramic composition. The mean particle size of the zirconia powder used as the raw material may be less than 0.7 μm or may be greater than 0.7 μm. The zirconia powder used as the raw material is not limited to 3YSZ powder but may be another powder containing zirconia.

After weighing the respective powders (process P105), the manufacturer performs preliminary pulverization (process P110). In the process of preliminary pulverization, the manufacturer mixes the alumina powder and the zirconia powder with a solvent (for example, ethanol) while crushing the particles of the respective powders using a ball mill (process P110). According to this embodiment, the time of preliminary pulverization is about 20 hours. According to other embodiments, the time of preliminary pulverization may be less than 20 hours or may be longer than 20 hours.

After the preliminary pulverization (process P110), the manufacturer adds the tungsten carbide powder, a solvent and a dispersant to the mixture in the ball mill and further continues mixing and crushing (process P120). The manufacturer accordingly obtains a slurry in which the respective particles of alumina, tungsten carbide and zirconia are dispersed. According to this embodiment, the time of adding the tungsten carbide powder and further continuing mixing and crushing is about 20 hours. According to other embodiments, this time may be less than 20 hours or may be longer than 20 hours.

For example, FLOWLEN G-700 (manufactured by KYOEISHA CHEMICAL Co., LTD), SN Dispersant 9228 (manufactured by SAN NOPCO LIMITED), MALIALIM (registered trademark) AKM-0531 (manufactured by NOF CORPORATION) or KAOCER 8000 (manufactured by Kao Corporation) may be used as the dispersant to be added to the mixture. The amount of addition of the dispersant is preferably not lower than 1.5% by mass and not higher than 3.5% by mass relative to the total mass of all the raw material powders and is 2.0% by mass according to this embodiment. According to other embodiments, the amount of addition of the dispersant may be lower than 1.5% by mass or may be higher than 3.5% by mass.

After preparation of the slurry (process P120), the manufacturer produces a powdery mixture from the slurry (process P130). The respective particles of alumina, tungsten carbide and zirconia are mixed in the powdery mixture obtained from the slurry. According to this embodiment, the manufacturer heats the slurry in a water bath while degassing to remove the solvent from the slurry and subsequently sieves the resulting powder obtained by removing the solvent from the slurry to produce a powdery mixture.

After production of the powdery mixture (process P130), the manufacturer manufactures a ceramic composition from the powdery mixture by hot pressing (process P150). According to this embodiment, in the process of hot pressing, the manufacturer packs the powdery mixture into a carbon mold and heats the powdery mixture under uniaxial pressing. As a result, the manufacturer obtains a ceramic composition as a sintered body of the powdery mixture.

The following conditions are employed for hot pressing (process P150) according to this embodiment:
sintering temperature: 1750° C.
sintering time: 2 hours
pressure: 30 MPa (megapascal)
atmosphere gas: argon (Ar)

The ceramic composition is completed by this series of processes. After hot pressing (process P150), the manufacturer may finish the shape and the surface of the ceramic composition by at least one processing technique of cutting, grinding and polishing. The manufacturer may manufacture a cutting tool made of the ceramic composition by the above manufacturing method.

EXAMPLES

C. Evaluation Tests

Tables 1 and 2 below show the results of evaluation tests with regard to the mechanical properties, the thermal properties and the durability of ceramic compositions. The examiner produced a plurality of samples as ceramic compositions and examined the presence or non-presence of zirconium (Zr) element in the grain boundaries, the area ratio A/(A+B)×100, the mechanical properties, the thermal properties and the durability of the respective samples.

The examiner detected the presence or non-presence of element Zr in the grain boundaries of each sample by the following procedure;

Step 1; The examiner cut out a 100 nm square thin piece from any arbitrary part of each sample using a focused ion beam system (FIB system) and observed any arbitrary surface of the thin piece by STEM to identify the first grain boundary 40 and the second grain boundary 50; and Step 2; The examiner measured the concentration of element Zr in five locations selected from the respective grain boundaries, i.e., the first grain boundary 40 and the second grain boundary 50, of each sample as described above with reference to FIGS. 2A and 2B by EDS, so as to detect the presence or non-presence of element Zr in the grain boundaries.

The Examiner determined the area ratio A/(A+B)×100 of each sample by the following procedure;

Step 1; The examiner observed any arbitrary surface of each sample subject to mirror polishing and subsequent etching by SEM and selected any five 10 μm square regions from an image of the surface taken at 10000-fold magnification;

Step 2; The examiner calculated an area (A+B) occupied by the tungsten carbide crystal grains 20(A) and the tungsten carbide crystal grains 20(B) in each selected region and an area A occupied by the tungsten carbide crystal grains 20(A) in the selected region using an image analysis software program ("WinRoof" manufactured by MITANI CORPORATION); and Step 3; The examiner divided the area A by the area (A+B) to calculate the area ratio A/(A+B)×100.

With regard to the mechanical properties of each sample, the examiner produced a test piece from each sample and determined the bending strength, the fracture toughness and the hardness of the test piece. The test piece was formed in the shape of a prism having a rectangular cross section and had the dimensions of 40 mm in length, 4 mm in width and 3 mm in thickness. With regard to the bending strength, the examiner determined the 3-point bending strength of each sample under the condition of an external span length (span) of 30 mm in conformity with Japanese Industrial Standards (JIS) R 1601. With regard to the fracture toughness, the examiner determined a value of fracture toughness (critical stress intensity factor) $K_{IC}$ of each sample in conformity with the IF (Indentation Fracture) method specified in JIS R 1607. With regard to the hardness, the examiner determined the Vickers hardness of each sample in conformity with JIS R 1610.

With regard to the thermal properties of each sample, the examiner determined the coefficient of thermal expansion and the thermal conductivity. With regard to the coefficient of thermal expansion, the examiner determined the coefficient of thermal expansion of each sample at 600° C. in conformity with JIS R 1618. With regard to the thermal conductivity, the examiner determined the thermal conductivity of each sample at room temperature in conformity with JIS R 1611.

With regard to the durability of each sample, the examiner manufactured a cutting tool from each sample, performed a cutting test using the cutting tool and evaluated the cutting tool for the condition of its cutting edge and the abrasion loss as the durability. The cutting tool manufactured from each sample had a shape specified by a code "RCGX120700T01020" in conformity with JIS B 4120. A work material to be cut in the cutting test was a cast product made of inconel 718 ("inconel" is registered trademark) and had a pierced disk shape having the outer diameter of 250 mm.

The following conditions were employed for the cutting test:
  cutting speed: 240 m/minute, 360 m/minute and 480 m/minute
  number of passes: 5 passes
  length per pass: 200 mm
  cutting depth: 1.0 mm
  feeding amount: 0.2 mm/rotation
  cooling water: used The following criteria were employed for evaluation of the condition of the cutting edge:
  "circle (good)": not fractured without flaking
  "triangle (fair)": not fractured with flaking
  "cross mark (poor)": fractured The following criteria were employed for evaluation of the abrasion loss:
  "circle (good)": abrasion loss of less than 0.6 mm
  "triangle (fair)": abrasion loss of not less than 0.6 mm but less than 1.0 mm
  "cross mark (poor)": abrasion loss of not less than 1.0 mm
  (not evaluated): The abrasion loss could not be evaluated, due to the fracture of the cutting edge.

C1. Evaluation with Regard to Presence or Non-Presence of Zr in Grain Boundaries A sample 1 was a ceramic composition produced by the manufacturing method of FIG. 3 using 55.0% by volume of alumina powder, 40.0% by volume of tungsten carbide powder and 5.0% by volume of zirconia powder as the raw materials. In the sample 1, the alumina powder had the mean particle size of about 0.5 μm, the tungsten carbide powder had the mean particle size of about 0.7 μm and the zirconia powder had the mean particle size of about 0.7 μm. The respective images of FIGS. 1 and 2 have the structure of the sample 1. The area ratio A/(A+B)×100 of the sample 1 was 9.0%. In the sample 1, Zr was distributed both in the first grain boundary 40 and in the second grain boundary 50.

A sample SC1 was a ceramic composition produced in the same manner as the sample 1, except that the zirconia powder had the greater mean particle size of about 1.7 μm than the mean particle size of the raw material of the sample 1 and that all the raw materials were simultaneously mixed and crushed without the preliminary pulverization (process P110). The area ratio A/(A+B)×100 of the sample SC1 was 10.5%.

FIGS. 4A and 4B are diagrams illustrating grain boundaries in the sample SC1. FIG. 4A illustrates an image of a first grain boundary 40 and a graph of the concentration of element Zr measured in the periphery of the first grain boundary 40 with regard to the sample SC1, like FIGS. 2A and 2B. The abscissa of the graph in FIG. 4A corresponds to positions B1, B2 and B3 on a straight line intersecting with the first grain boundary 40. FIG. 4B illustrates an image of a second grain boundary 50 and a graph of the concentration of element Zr measured in the periphery of the second grain boundary 50 with regard to the sample SC1, like FIG. 2. The abscissa of the graph in FIG. 4B corresponds to positions B4, B5 and B6 on a straight line intersecting with the second grain boundary 50. In the sample SC1, Zr was distributed neither in the first grain boundary 40 nor in the second grain boundary 50.

A sample SC2 was a ceramic composition produced in the same manner as the sample 1, except that all the raw materials were simultaneously mixed and crushed without the preliminary pulverization (process P110). The area ratio A/(A+B)×100 of the sample SC2 was 11.2%.

FIGS. 5A and 5B are diagrams illustrating grain boundaries in the sample SC2. FIG. 5A illustrates an image of a first grain boundary 40 and a graph of the concentration of element Zr measured in the periphery of the first grain boundary 40 with regard to the sample SC2, like FIG. 2. The abscissa of the graph in FIG. 5A corresponds to positions C1, C2 and C3 on a straight line intersecting with the first grain boundary 40. FIG. 5B illustrates an image of a second grain boundary 50 and a graph of the concentration of element Zr measured in the periphery of the second grain boundary 50 with regard to the sample SC2, like FIG. 2. The abscissa of the graph in FIG. 5B corresponds to positions C4, C5 and C6 on a straight line intersecting with the second grain boundary 50. In the sample SC2, Zr was distributed in the first grain boundary 40 but was not distributed in the second grain boundary 50.

Referring to Table 1 below, with regard to the mechanical properties of the sample 1, the sample SC1 and the sample SC2, the bending strength of the sample 1 was not less than twice the bending strength of the sample SC1 and was not less than 1.6 times the bending strength of the sample SC2. The respective samples were substantially equivalent in the other mechanical properties, i.e., the fracture toughness and the hardness. The respective samples, i.e., the sample 1, the sample SC1 and the sample SC2, were also substantially equivalent in the thermal properties (coefficient of thermal expansion and thermal conductivity).

The cutting test of the sample 1 did not cause either fracture or flaking at any cutting speed, and the abrasion loss was less than 0.6 mm. The cutting test of the samples SC1 and SC2, on the other hand, caused fractures at any cutting speeds.

The results of the bending strength and the cutting test with regard to the sample 1, the sample SC1 and the sample SC2 may be attributed to that Zr distributed in the first grain boundary 40 and in the second grain boundary 50 enhances the binding force between the crystal grains in each grain boundary.

Comparison among the sample 1, the sample SC1 and the sample SC2 shows that the particle size of zirconia powder as the raw material affects the presence or non-presence of Zr in the first grain boundary 40. Using zirconia powder having the excessively large particle size as the raw material results in no distribution of Zr in the first grain boundary 40, like the sample SC1. Accordingly, in order to distribute Zr in the first grain boundary 40, it is preferable that the mean particle size of zirconia powder as one raw material is substantially similar to the mean particle size of tungsten carbide powder as another raw material.

Comparison among the sample 1, the sample SC1 and the sample SC2 also shows that the preliminary pulverization (process P110) in the manufacturing process affects the presence or non-presence of Zr in the second grain boundary 50. When the preliminary pulverization (process P110) is not performed, Zr is not distributed in the second grain boundary 50, like the samples SC1 and SC2. Accordingly, in order to distribute Zr in the second grain boundary 50, it is preferably to perform the preliminary pulverization (process P110) in the manufacturing process. The preliminary pulverization (process P110) enables zirconia as the supply source of element Zr to be finer and to be homogeneously distributed. This results in diffusing and distributing Zr in the second grain boundary 50.

C2. Evaluation on Amount of Addition of Dispersant and Area Ratio A/(A+B)×100

Samples 2 to 6 and samples SC3 to SC6 shown in Table 1 below were ceramic compositions produced in the same manner as the sample 1, except that different amounts of the dispersant were added during manufacture. The amount of addition of the dispersant was varied from the minimum of 0.1% by mass of the sample SC3 to the maximum of 3.5% by mass of the sample 6, relative to 2.0% by mass of the sample 1. In the samples 2 to 6 and the samples SC3 to SC6, Zr was distributed both in the first grain boundary 40 and in the second grain boundary 50.

Figure 6:
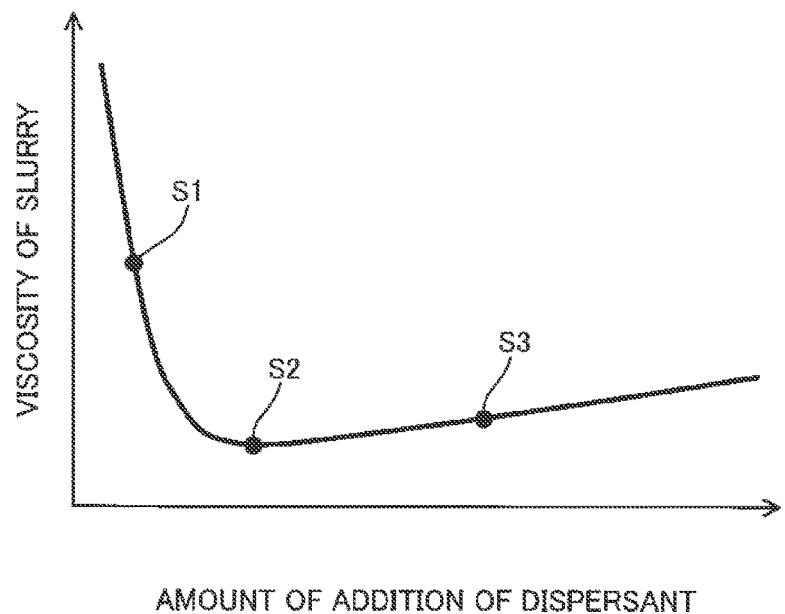
FIG. 6 is a graph showing the relationship between the amount of addition of a dispersant and the viscosity of a slurry.

FIG. 6 is a graph showing the relationship between the amount of addition of a dispersant and the viscosity of a slurry, with the amount of addition of the dispersant as abscissa and the viscosity of the slurry as ordinate. The viscosity of the slurry produced by mixing raw material powders of a ceramic composition abruptly decreases by addition of the dispersant (state S1). In the case of increasing the amount of addition of the dispersant relative to the amount in the state S1, the viscosity of the slurry gradually decreases to its minimum (state S2). In the case of further increasing the amount of addition of the dispersant relative to the amount in the state S2, the viscosity of the slurry gradually increases with an increase in amount of the dispersant (state S3).

Figure 7:
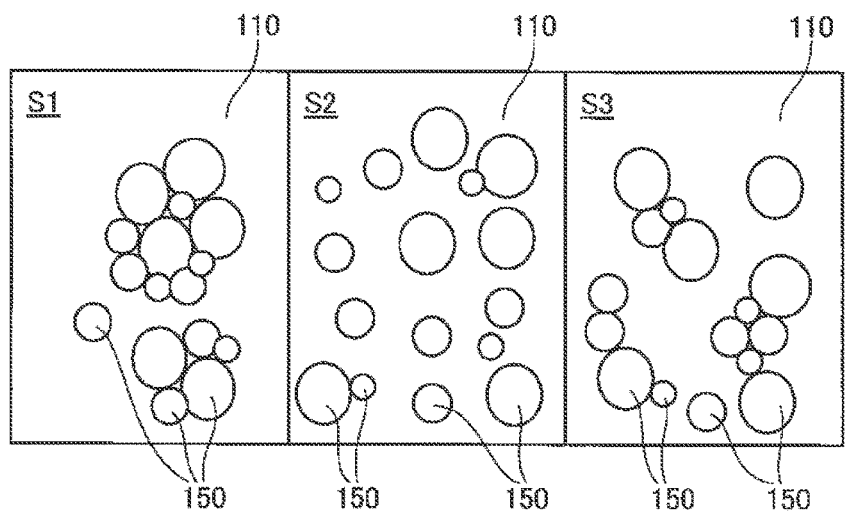
FIG. 7 is a diagram schematically illustrating the variation in state of the slurry with a variation in amount of addition of the dispersant.

FIG. 7 is a diagram schematically illustrating the variation in state of the slurry with a variation in amount of addition of the dispersant. An image on the left side of FIG. 7 schematically illustrates the slurry in the state S1 of FIG. 6. An image on the center of FIG. 7 schematically illustrates the slurry in the state S2 of FIG. 6. An image on the right side of FIG. 7 schematically illustrates the slurry in the state S3 of FIG. 6.

In the slurry of the state S1, some of particles 150 originating from the raw material powders are dispersed in the aggregated state in a solvent 110. In the slurry of the state S2, the individual particles 150 originating from the raw material powders are dispersed in the solvent 110 in the substantially separated state by the action of the dispersant. In the slurry of the state S3, some of the particles 150 individually separated by the action of the dispersant are dispersed in the solvent 110 in the re-aggregated state by crosslinking of the dispersant molecules.

In the samples SC3 and SC4 having the amount of addition of the dispersant of 0.1 to 0.3% by mass, the slurry was in the state S1. In the samples SC5 and SC6 having the amount of addition of the dispersant of 0.8 to 1.0% by mass, the slurry was in the state S2. In the samples 1 to 6 having the amount of addition of the dispersant of 1.5 to 3.5% by mass, the slurry was in the state S3.

Figure 8A:
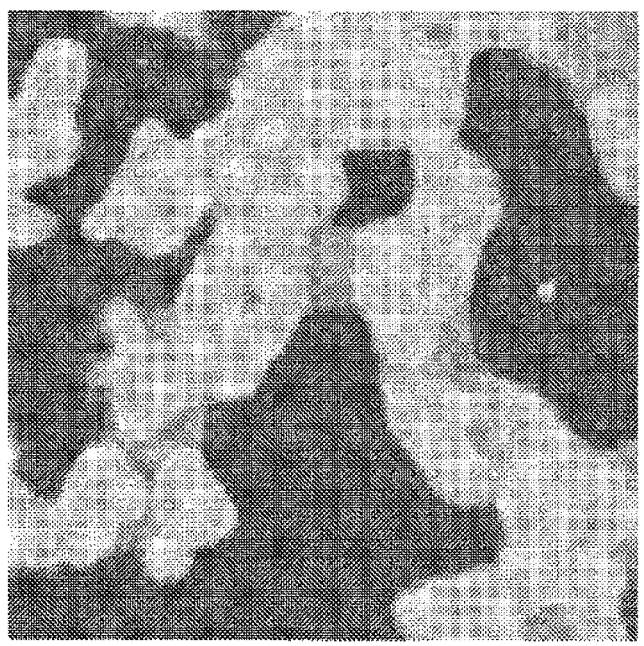
FIGS. 8A and 8B are diagrams illustrating the structure of a sample SC3.
Figure 8B:
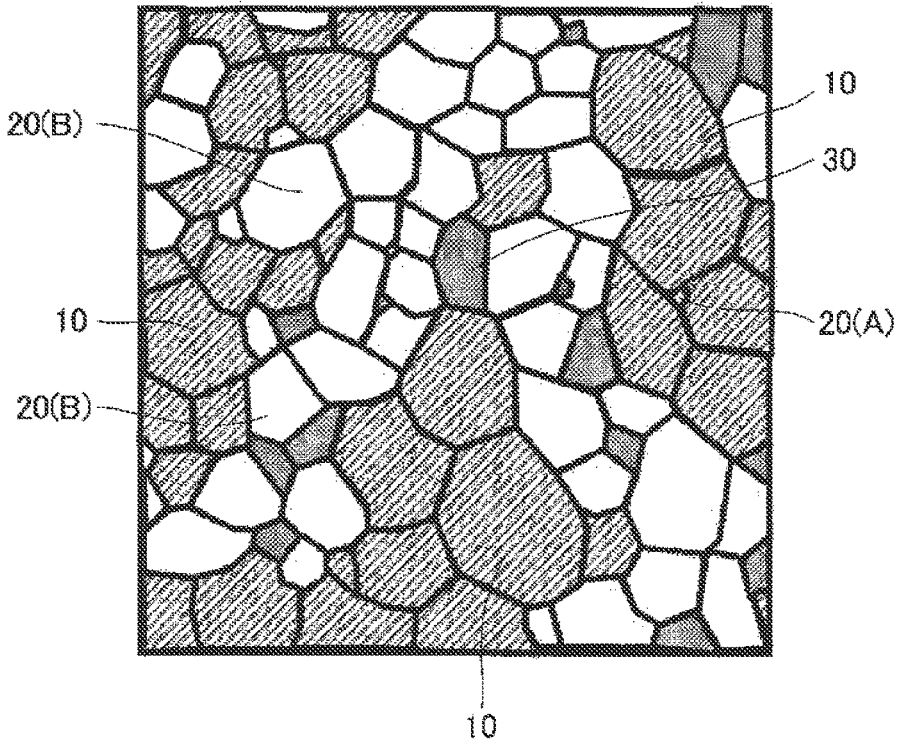

FIGS. 8A and 8B are diagrams illustrating the structure of the sample SC3. An image shown in FIG. 8A is an SEM image of an arbitrary surface of the sample SC3, like the image of FIGS. 1A and 1B. An image shown in FIG. 8B is a diagrammatic representation of the crystal grains shown in the image of FIG. 8A. The sample SC3 shown in FIGS. 8A and 8B has a lower ratio of the tungsten carbide crystal grains 20(A) than that in the sample 1 shown in FIGS. 1A and 1B.

Figure 9A:
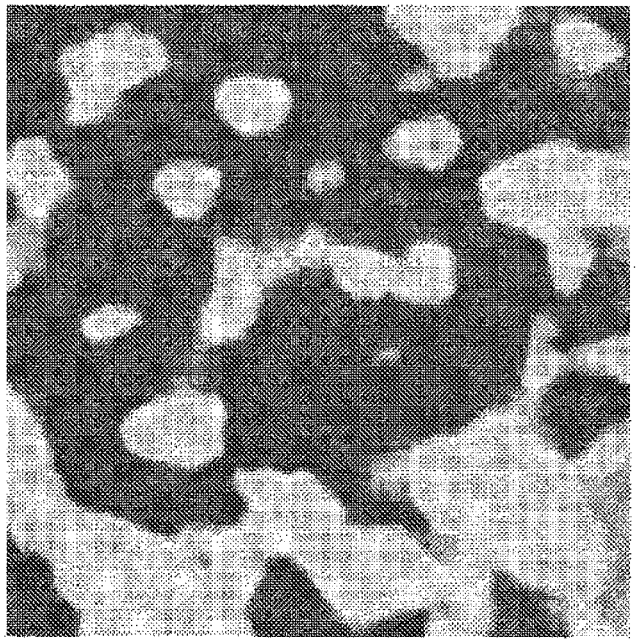
FIGS. 9A and 9B are diagrams illustrating the structure of a sample 4.
Figure 9B:
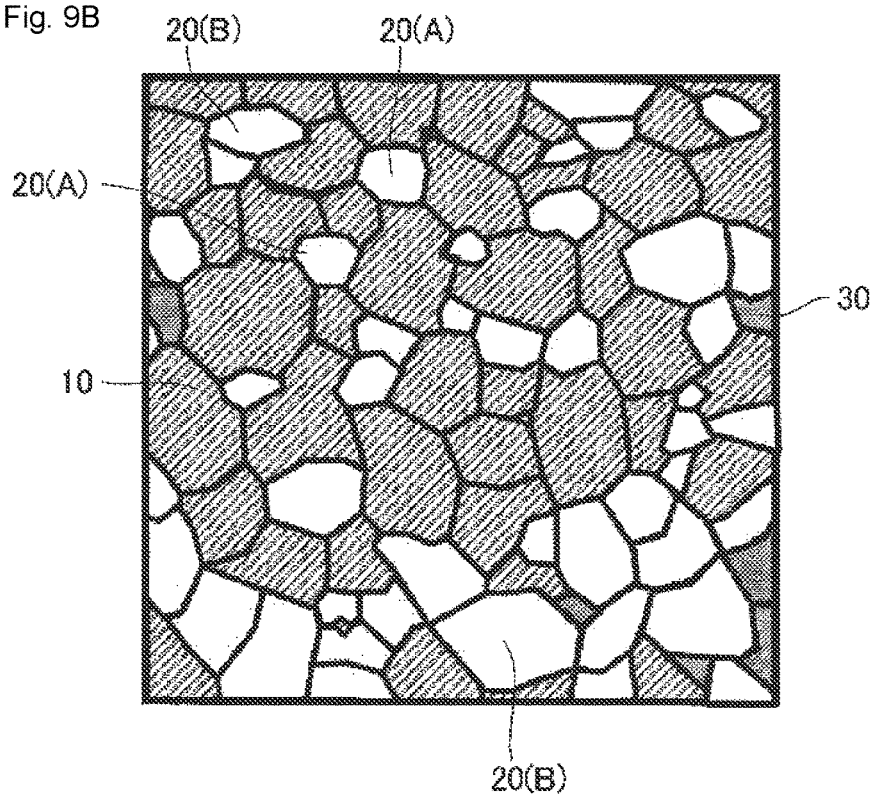
Figure 10:
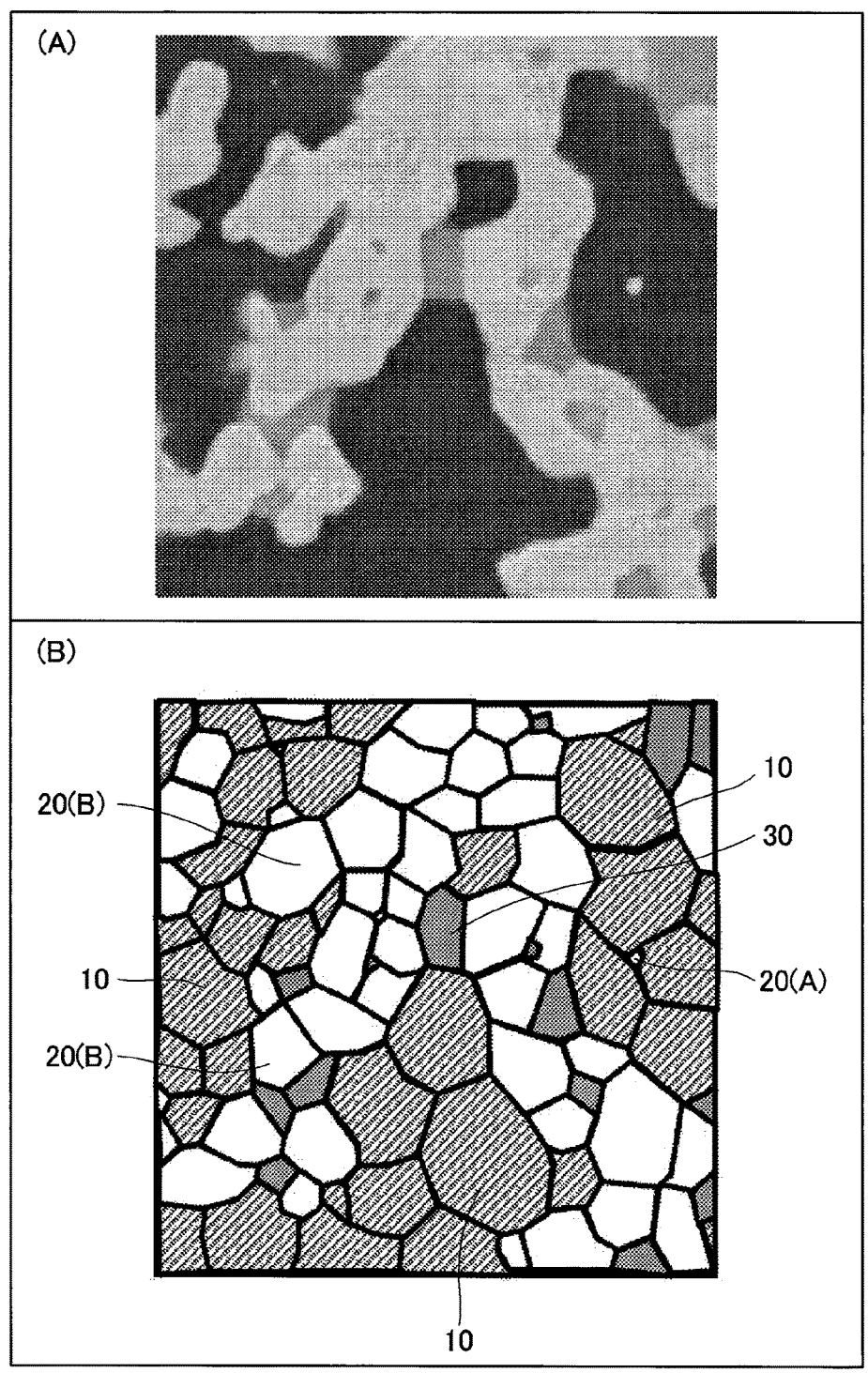
Figure 11:
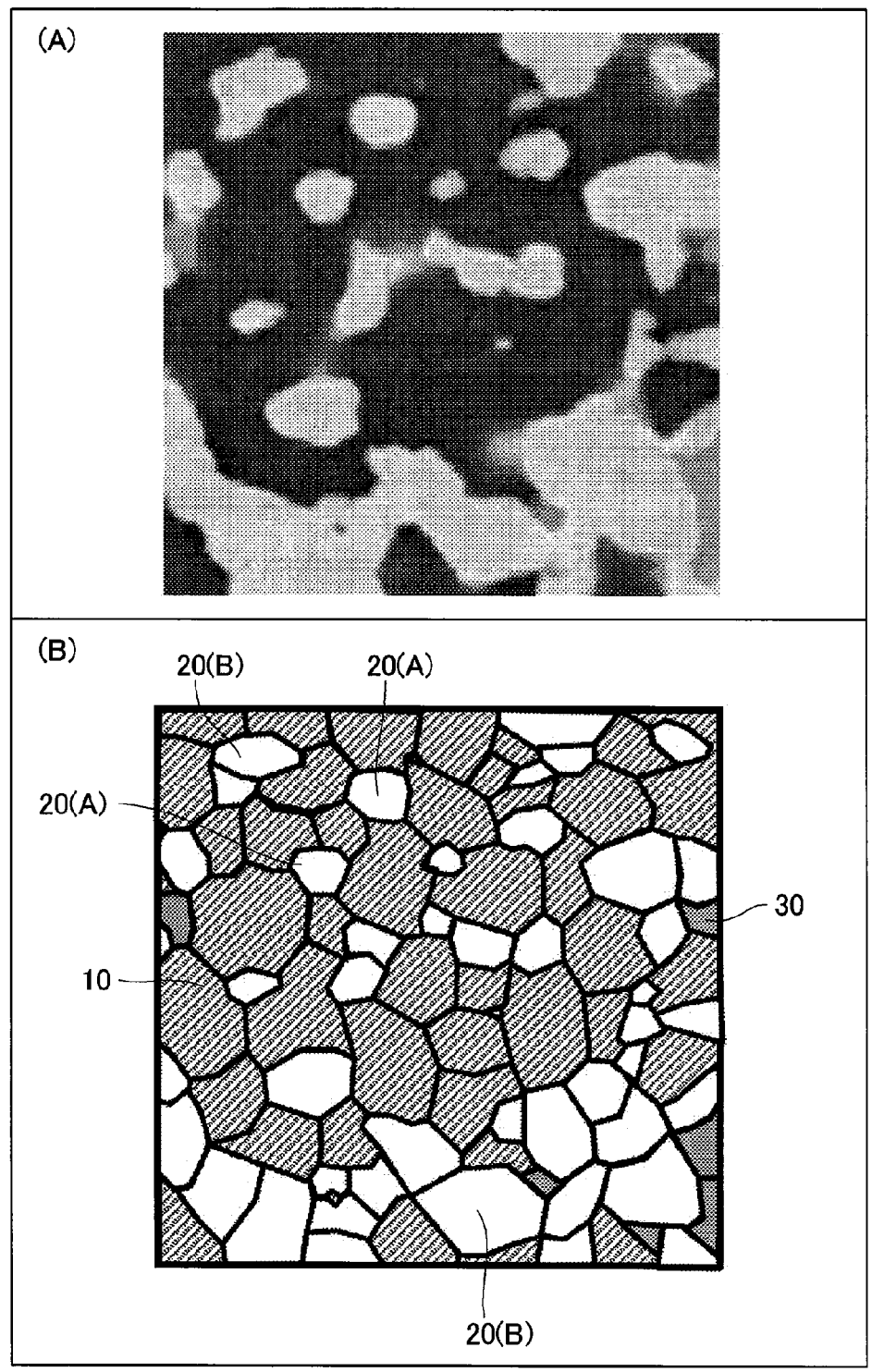

FIGS. 9A and 9B are diagrams illustrating the structure of the sample 4. An image shown in FIG. 9A is an SEM image of an arbitrary surface of the sample 4, like the image of FIGS. 1A and 1B. An image shown in FIG. 9B is a diagrammatic representation of the crystal grains shown in the image of FIG. 9A. The sample 4 shown in FIGS. 9A and 9B has a higher ratio of the tungsten carbide crystal grains 20(A) than that in the sample shown in FIGS. 1A and 1B.

In all the samples 2 to 6 having the area ratio A/(A+B)×100 of 1.5 to 50.0%, the cutting test did not cause any fracture or flaking at any cutting speed, and the abrasion loss was less than 0.6 mm, like the sample 1. In the samples SC3 and SC4 having the area ratio A/(A+B)×100 of lower than 1.5%, on the other hand, the relatively low-speed cutting tests (cuttings speeds of 240 m/minute and 360 m/minute) having relatively high cutting resistance caused fracture, whereas the relatively high-speed cutting test (cutting speed of 480 m/minute) caused flaking and increased the abrasion loss compared with those of the samples 1 to 6. These results may be attributed to the insufficient bending strength, which results from acceleration of the grain growth of alumina in the samples SC3 and SC4 having the area ratio A/(A+B)×100 of lower than 1.5% and from insufficient reinforcement of the crystal grains by the compressive residual stress occurring in the tungsten carbide crystal grains 20(A) surrounded by alumina and/or zirconia having the relatively high coefficients of thermal expansion.

In the samples SC5 and SC6 having the area ratio A/(A+B)×100 of higher than 50.0%, the relatively high-speed cutting tests (cutting speeds of 360 m/minute and 480 m/minute) having relatively high temperature caused fracture, whereas the relatively low-speed cutting test (cutting speed of 240 m/minute) caused flaking and increased the abrasion loss compared with those of the samples 1 to 6. These results may be attributed to the insufficient thermal conductivity, which results from insufficient improvement of thermal conduction by the thermal conduction pathway formed by linkage of the tungsten carbide crystal grains 20(B).

Accordingly, in terms of achieving reinforcement of the crystal grains by the tungsten carbide crystal grains 20(A) simultaneously with improvement of thermal conduction by the tungsten carbide crystal grains 20(B), it is preferable that the relationship between the cross sectional area A of the tungsten carbide crystal grain 20(A) and the cross sectional area B of the tungsten carbide crystal grain 20(B) satisfies $1.5 \leq A/(A+B) \times 100 \leq 50.0$. Additionally, in terms of facilitating adjustment of the area ratio A/(A+B)×100, it is preferable that the amount of addition of the dispersant is greater than the amount specified to make the slurry in the state S2.

Table 1 below shows the results of evaluation tests with regard to the mechanical properties, the thermal properties and the durability of ceramic compositions of Sample Nos. 1 to 6 and SC1 to SC6.

TABLE 1

| Sample | Composition Al$_2$O$_3$ vol % | Composition WC vol % | Composition ZrO$_2$ vol % | Preliminary Particle size μm | Preliminary Pulverization P/NP* | Amount of Dispersant Added wt % | Sintering Temp °C. | Element Zr in Grain Boundary Al$_2$O$_3$/WC P/NP** | Element Zr in Grain Boundary Al$_2$O$_3$/Al$_2$O$_3$ P/NP** | Area Ratio A/(A + B) × 100 % | Bending Strength span: 30 mm MPa |
|---|---|---|---|---|---|---|---|---|---|---|---|
| 1 | 55.0 | 40.0 | 5.0 | 0.7 | P* | 2.0 | 1750 | P** | P** | 9.0 | 1810 |
| SC1 | 55.0 | 40.0 | 5.0 | 0.7 | NP* | 2.0 | 1750 | NP** | NP** | 10.5 | 890 |
| SC2 | 55.0 | 40.0 | 5.0 | 0.7 | NP* | 2.0 | 1750 | P** | NP** | 11.2 | 1100 |
| SC3 | 55.0 | 40.0 | 5,0 | 0.7 | P* | 0.1 | 1750 | P** | P** | 0.3 | 1100 |
| SC4 | 55.0 | 40.0 | 5.0 | 0.7 | P* | 0.3 | 1750 | P** | P** | 1.4 | 1490 |
| 2 | 55.0 | 40.0 | 5.0 | 0.7 | P* | 1.5 | 1750 | P** | P** | 50.0 | 1840 |
| 3 | 55.0 | 40.0 | 5.0 | 0.7 | P* | 1.6 | 1750 | P** | P** | 49.0 | 1840 |
| 4 | 55.0 | 40.0 | 5.0 | 0.7 | P* | 1.8 | 1750 | P** | P** | 21.0 | 1850 |
| 1 | 55.0 | 40.0 | 5.0 | 0.7 | P* | 2.0 | 1750 | P** | P** | 9.0 | 1810 |
| 5 | 55.0 | 40.0 | 5.0 | 0.7 | P* | 2.5 | 1750 | P** | P** | 2.0 | 1790 |
| 6 | 55.0 | 40.0 | 5.0 | 0.7 | P* | 3.5 | 1750 | P** | P** | 1.5 | 1630 |
| SC5 | 55.0 | 40.0 | 5.0 | 0.7 | P* | 0.8 | 1750 | P** | P** | 50.5 | 1830 |
| SC6 | 55.0 | 40.0 | 5.0 | 0.7 | P* | 1.0 | 1750 | P** | P** | 56.7 | 1850 |

| Sample | Fracture Toughness K$_{10}$ MPa·m$^{0.5}$ | Hardness Vickers GPa | Coefficient of Thermal Expansion at 600° C. ppm/K | Thermal Conductivity at room temperature W/(m·K) | Cutting Test 240 m/min 5 passes Cutting edge ○ > Δ > x | Cutting Test 240 m/min 5 passes Abrasion loss ○ > Δ > x | Cutting Test 360 m/min 5 passes Cutting edge ○ > Δ > x | Cutting Test 360 m/min 5 passes Abrasion loss ○ > Δ > x | Cutting Test 480 m/min 5 passes Cutting edge ○ > Δ > x | Cutting Test 480 m/min 5 passes Abrasion loss ○ > Δ > x |
|---|---|---|---|---|---|---|---|---|---|---|
| 1 | 4.6 | 22.2 | 6.4 | 34.4 | ○ | ○ | ○ | ○ | ○ | ○ |
| SC1 | 4.4 | 22.5 | 6.4 | 34.1 | x | — | x | — | x | — |
| SC2 | 4.5 | 22.4 | 6.5 | 33.0 | x | — | x | — | x | — |
| SC3 | 4.7 | 22.3 | 6.4 | 35.6 | x | — | x | — | | Δ |
| SC4 | 4.7 | 22.4 | 6.4 | 35.2 | x | | x | | | Δ |
| 2 | 4.4 | 23.1 | 6.4 | 34.0 | ○ | ○ | ○ | ○ | ○ | ○ |
| 3 | 4.5 | 22.9 | 6.4 | 34.2 | ○ | ○ | ○ | ○ | ○ | ○ |
| 4 | 4.5 | 22.8 | 6.3 | 34.3 | ○ | ○ | ○ | ○ | ○ | ○ |

TABLE 1-continued

| 1 | 4.6 | 22.6 | 6.4 | 34.4 | ○ | ○ | ○ | ○ | ○ | ○ |
|---|---|---|---|---|---|---|---|---|---|---|
| 5 | 4.7 | 22.3 | 6.3 | 34.5 | ○ | ○ | ○ | ○ | ○ | ○ |
| 6 | 4.7 | 22.4 | 6.3 | 34.9 | ○ | ○ | ○ | ○ | ○ | ○ |
| SC5 | 4.4 | 23.1 | 6.3 | 31.5 | Δ | Δ | x | — | x | — |
| SC6 | 4.3 | 23.3 | 6.3 | 31.0 | Δ | x | x | — | x | — |

P/NP*: *Performed/Not Performed
P*: *Performed
NP*: *Not Performed
P/NP: Present/Not Present
P: Present
NP: Not Present C3. Evaluation on Amount of Tungsten Carbide Samples 7 to 9 and samples SC7 to SC9 shown in Table 2 below were ceramic compositions produced in the same manner as the sample 1, except different amounts of alumina and tungsten carbide. A sample SC10 shown in Table 2 was a ceramic composition produced in the same manner as the sample 1, except different amounts of alumina and tungsten carbide as the raw materials and the sintering temperature of 1800° C. The amount of tungsten carbide was varied from the minimum of 10.0% by volume of the sample SC7 to the maximum of 60.0% by volume of the sample SC10, relative to 40.0% by volume of the sample 1. In the samples 7 to 9 and the samples SC7 to SC10, Zr was distributed both in the first grain boundary 40 and in the second grain boundary 50, and the area ratio A/(A+B)×100 was 3.9 to 48.0%.

In all the samples 7 to 9 having the amount of tungsten carbide of 20.0 to 50.0% by volume, the cutting test did not cause any fracture or flaking at any cutting speed, and the abrasion loss was less than 0.6 mm, like the sample 1. In the samples SC7 and SC8 having the amount of tungsten carbide of lower than 20.0% by volume, on the other hand, the cutting test caused either fracture or flaking and increased the abrasion loss compared with those of the samples 1 and 7 to 9. These results may be attributed to that the insufficient amount of tungsten carbide causes the insufficient bending strength, the insufficient hardness and the insufficient thermal conductivity.

In the samples SC9 and SC10 having the amount of tungsten carbide of higher than 50.0% by volume, irrespective of their relatively better mechanical properties and thermal properties, the cutting test caused either fracture or flaking and increased the abrasion loss compared with those of the samples 1 and 7 to 9. These results may be attributed to that the excessive amount of tungsten carbide causes tungsten carbide to be more susceptible to the chemical reaction of converting tungsten carbide to a relatively fragile substance (for example, tungsten oxide ($WO_3$)) and reduces the reaction resistance of the entire ceramic composition.

Accordingly, in terms of improving the mechanical properties, the thermal properties and the reaction resistance, it is preferable that tungsten carbide occupies not lower than 20.0% by volume and not higher than 50.0% by volume in the ceramic composition.

C4. Evaluation on Amount of Zirconia

A sample 10 and a sample SC11 shown in Table 2 were ceramic compositions produced in the same manner as the sample 1, except different amounts of alumina and zirconia. Samples 11 and 12 and samples SC12 and SC13 shown in Table 2 were ceramic compositions produced in the same manner as the sample 1, except different amounts of alumina powder and zirconia powder as the raw materials and the sintering temperature of 1700° C. The amount of zirconia was varied from the minimum of 0.05% by volume of the sample SC11 to the maximum of 25.0% by volume of the sample SC13, relative to 5.0% by volume of the sample 1. In the samples 10 to 12 and the samples SC12 and SC13, Zr was distributed both in the first grain boundary 40 and in the second grain boundary 50, and the area ratio A/(A+B)×100 was 8.5 to 12.2%. In the sample SC11, however, Zr was distributed neither in the first grain boundary 40 nor in the second grain boundary 50, and the area ratio A/(A+B)×100 was 8.2%.

In all the samples 10 to 12 having the amount of zirconia of 0.1 to 18.0% by volume, the cutting test did not cause any fracture or flaking at any cutting speed, and the abrasion loss was less than 0.6 mm, like the sample 1. In the sample S11 having the amount of zirconia of lower than 0.1% by volume, on the other hand, the cutting test caused fractures at any cutting speeds. This result may be attributed to that the insufficient amount of zirconia causes a failure of distributing Zr in either of the first grain boundary 40 and the second grain boundary 50.

In the samples SC12 and SC13 having the amount of zirconia of 18.5 to 25.0% by volume, the cutting test caused either fracture or flaking and increased the abrasion loss compared with those of the samples 1 and 10 to 12. These results may be attributed to that the excessive amount of zirconia causes the insufficient hardness and the insufficient thermal conductivity and increases the coefficient of thermal expansion.

C5. Comparison with Whisker-Type Ceramic Composition

A sample SC14 shown in Table 2 was a commercially available cutting tool ("WA1" manufactured by NGK SPARK PLUG CO., LTD.) made of a whisker-type ceramic composition. The cutting test of the sample 1 did not cause any fracture or flaking at any cutting speed, and the abrasion loss was less than 0.6 mm. In the sample SC14, on the other hand, the relatively high-speed cutting tests (cutting speeds of 360 m/minute and 480 m/minute) having relatively high temperature caused fracture, whereas the relatively low-speed cutting test (cutting speed of 240 m/minute) caused flaking and increased the abrasion loss compared with that of the sample 1. As clearly understood from comparison between the sample 1 and the sample SC14, distributing Zr both in the first grain boundary 40 and in the second grain boundary 50 improves the durability of the alumina/tungsten carbide/zirconia-based ceramic composition to be better than that of the whisker-type ceramic composition.

Table 2 below shows the results of evaluation tests with regard to the mechanical properties, the thermal properties and the durability of ceramic compositions of Sample Nos. 7 to 12 and SC7 to SC14.

TABLE 2

| Sample | Composition Al₂O₃ vol % | WC vol % | ZrO₂ vol % | ZrO₂ Particle size μm | Preliminary Pulverization P/NP* | Amount of Dispersant Added wt % | Sintering Temp °C. | Element Zr in Grain Boundary Al₂O₃/WC P/NP** | Element Zr in Grain Boundary Al₂O₃/Al₂O₃ P/NP** | Area Ratio A/(A + B) × 100 % | Bending Strength span: 30 mm MPa |
|---|---|---|---|---|---|---|---|---|---|---|---|
| SC7 | 85.0 | 10.0 | 5.0 | 0.7 | P* | 2.0 | 1700 | P** | P** | 48.0 | 1210 |
| SC8 | 76.0 | 19.0 | 5.0 | 0.7 | P* | 2.0 | 1700 | P** | P** | 35.6 | 1480 |
| 7 | 75.0 | 20.0 | 5.0 | 0.7 | P* | 2.0 | 1700 | P** | P** | 35.0 | 1650 |
| 8 | 65.0 | 30.0 | 5.0 | 0.7 | P* | 2.0 | 1700 | P** | P** | 14.9 | 1790 |
| 1 | 55.0 | 40.0 | 5.0 | 0.7 | P* | 2.0 | 1750 | P** | P** | 9.0 | 1810 |
| 9 | 45.0 | 50.0 | 5.0 | 0.7 | P* | 2.0 | 1750 | P** | P** | 5.0 | 1940 |
| SC9 | 44.0 | 51.0 | 5.0 | 0.7 | P* | 2.0 | 1750 | P** | P** | 4.7 | 1940 |
| SC10 | 35.0 | 60.0 | 5.0 | 0.7 | P* | 2.0 | 1800 | P** | P** | 3.9 | 1950 |
| SC11 | 59.95 | 40.0 | 0.05 | 0.7 | P* | 2.0 | 1750 | NP** | NP** | 8.2 | 1010 |
| 10 | 59.9 | 40.0 | 0.1 | 0.7 | P* | 2.0 | 1750 | P** | P** | 8.5 | 1610 |
| 1 | 55.0 | 40.0 | 5.0 | 0.7 | P* | 2.0 | 1750 | P** | P** | 9.0 | 1810 |
| 11 | 45.0 | 40.0 | 15.0 | 0.7 | P* | 2.0 | 1700 | P** | P** | 9.6 | 1920 |
| 12 | 42.0 | 40.0 | 18.0 | 0.7 | P* | 2.0 | 1700 | P** | P** | 10.1 | 1910 |
| SC12 | 41.5 | 40.0 | 18.5 | 0.7 | P* | 2.0 | 1700 | P** | P** | 11.3 | 1900 |
| SC13 | 35.0 | 40.0 | 25.0 | 0.7 | P* | 2.0 | 1700 | P** | P** | 12.2 | 1850 |
| 1 | 55.0 | 40.0 | 5.0 | 0.7 | P* | 2.0 | 1750 | P** | P** | 9.0 | 1810 |
| SC14 | — | — | — | — | — | — | — | — | — | — | 1200 |

| Sample | Fracture Toughness $K_{10}$ MPa·m^0.5 | Hardness Vickers GPa | Coefficient of Thermal Expansion at 600° C. ppm/K | Thermal Conductivity at room temperature W/(m·K) | Cutting Test 240 m/min 5 passes Cutting edge ○ > Δ > x | Cutting Test 240 m/min 5 passes Abrasion loss ○ > Δ > x | Cutting Test 360 m/min 5 passes Cutting edge ○ > Δ > x | Cutting Test 360 m/min 5 passes Abrasion loss ○ > Δ > x | Cutting Test 480 m/min 5 passes Cutting edge ○ > Δ > x | Cutting Test 480 m/min 5 passes Abrasion loss ○ > Δ > x |
|---|---|---|---|---|---|---|---|---|---|---|
| SC7 | 4.0 | 20.4 | 7.1 | 28.9 | Δ | x | Δ | x | x | — |
| SC8 | 4.1 | 20.8 | 6.9 | 30.9 | Δ | x | Δ | Δ | Δ | Δ |
| 7 | 4.2 | 21.3 | 6.8 | 31.8 | ○ | ○ | ○ | ○ | ○ | ○ |
| 8 | 4.4 | 21.9 | 6.5 | 33.3 | ○ | ○ | ○ | ○ | ○ | ○ |
| 1 | 4.6 | 22.2 | 6.4 | 34.4 | ○ | ○ | ○ | ○ | ○ | ○ |
| 9 | 5.0 | 23.5 | 6.2 | 35.9 | ○ | ○ | ○ | ○ | ○ | ○ |
| SC9 | 5.1 | 23.6 | 6.3 | 36.1 | Δ | ○ | Δ | Δ | Δ | Δ |
| SC10 | 5.4 | 23.8 | 6.0 | 38.0 | Δ | Δ | Δ | x | x | — |
| SC11 | 4.2 | 22.9 | 6.3 | 34.9 | x | x | x | x | x | x |
| 10 | 4.4 | 23.0 | 6.3 | 34.9 | ○ | ○ | ○ | ○ | ○ | ○ |
| 1 | 4.6 | 22.2 | 6.4 | 34.4 | ○ | ○ | ○ | ○ | ○ | ○ |
| 11 | 4.8 | 21.1 | 6.8 | 33.1 | ○ | ○ | ○ | ○ | ○ | ○ |
| 12 | 5.0 | 21.0 | 6.9 | 32.6 | ○ | ○ | ○ | ○ | ○ | ○ |
| SC12 | 5.0 | 20.9 | 7.0 | 31.2 | Δ | Δ | Δ | x | Δ | x |
| SC13 | 6.0 | 20.5 | 7.2 | 26.5 | Δ | x | Δ | x | x | — |
| 1 | 4.6 | 22.2 | 6.4 | 34.4 | ○ | ○ | ○ | ○ | ○ | ○ |
| SC14 | 5.2 | 20.3 | 6.8 | 31.7 | Δ | x | x | — | x | — |

P/NP*: *Performed/Not Performed
P*: *Performed
P/NP: Present/Not Present
P: Present
NP: Not Present

D. Other Embodiments

The invention is not limited to any of the embodiments, the examples and the modifications described above but may be implemented by a diversity of other configurations without departing from the scope of the invention. For example, the technical features of the embodiments, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

The technique employed to effectively distribute zirconium (Zr) in the grain boundaries of the ceramic composition is not limited to the preliminary pulverization (process P110) of the embodiment described above but may be any of the following techniques:

technique of complexing particles by the compressive force and the shear force (technique of processing powder, for example, using Nobilta (registered trademark) manufactured by Hosokawa Micron Corporation);

technique of processing powder using a bead mill; and technique using ultrafine particle zirconia produced by the alkoxide method.

Any of these techniques enables zirconia as the supply source of element Zr to be finer and to be homogeneously dispersed. This results in diffusing and distributing Zr in the grain boundaries of the ceramic composition.

The element added to enhance the binding force in the grain boundaries of the ceramic composition is not limited to zirconium (Zr) of the embodiment described above but may be any of the following elements:

transition metals belonging to the groups 4 to 6 (except tungsten (W)) in the periodic table;

yttrium (Y);
scandium (Sc); and
lanthanide series (any elements of atomic numbers 57 to 71; europium (Eu) and ytterbium (Yb) are especially preferable).

A component of the ceramic composition is not limited to zirconia ($ZrO_2$) of the embodiment described above but may be at least one compound selected from the group consisting of compounds of transition metals belonging to the groups 4 to 6 (except tungsten (W)) in the periodic table, yttrium compounds, scandium compounds and lanthanide compounds. In other words, the ceramic composition may be mainly composed of alumina ($Al_2O_3$), tungsten carbide (WC) and at least one compound selected from the group consisting of compounds of transition metals belonging to the groups 4 to 6 (except tungsten (W)) in the periodic table, yttrium compounds, scandium compounds and lanthanide compounds. In this ceramic composition, at least one element selected from the group consisting of transition metals belonging to the groups 4 to 6 (except tungsten (W)) in the periodic table, yttrium (Y), scandium (Sc) and lanthanide series may be distributed in a first grain boundary as an interface where an alumina ($Al_2O_3$) crystal grain is adjacent to a tungsten carbide (WC) crystal grain and in a second grain boundary as an interface where two alumina ($Al_2O_3$) crystal grains are adjacent to each other (in the description below, the element distributed in the first grain boundary and in the second grain boundary is also called "additional element", and the compound of this element is also called "compound of additional element"). According to this embodiment, the additional element distributed in the first grain boundary and in the second grain boundary enhances the binding force between the crystal grains in each grain boundary. This accordingly improves the mechanical properties of the alumina/tungsten carbide-based ceramic composition and results in improving its durability.

On a cross section of the ceramic composition using the compound of additional element to enhance the binding force in the grain boundary, it is preferable that the relationship between a cross sectional area A of a tungsten carbide (WC) crystal grain which is not adjacent to another tungsten carbide (WC) crystal grain but is surrounded by at least one type of crystal grains selected from the group consisting of alumina ($Al_2O_3$), compounds of transition metals belonging to the groups 4 to 6 (except tungsten (W)) in the periodic table, yttrium compounds, scandium compounds and lanthanide compounds and a cross sectional area B of a tungsten carbide (WC) crystal grain adjacent to another tungsten carbide (WC) crystal grain satisfies $1.5 \leq A/(A+B) \times 100 \leq 50.0$.

In the ceramic composition using the compound of additional element to enhance the binding force in the grain boundary, it is preferable that tungsten carbide (WC) occupies a part of not lower than 20.0% by volume and not higher than 50.0% by volume, a zirconium compound occupies a part of not lower than 0.1% by volume and not higher than 18.0% by volume, and alumina ($Al_2O_3$) occupies a residual part. In the ceramic composition using the compound of additional element to enhance the binding force in the grain boundary, it is preferable that tungsten carbide (WC) occupies a part of not lower than 20.0% by volume and not higher than 50.0% by volume, a zirconium compound occupies a part of not lower than 0.1% by volume and not higher than 18.0% by volume, any of compounds of transition metals belonging to the groups 4 to 6 (except zirconium (Zr) and tungsten (W)) in the periodic table, yttrium compounds, scandium compounds and lanthanide compounds occupies a part of not lower than 0.1% by volume and not higher than 1.0% by volume, and alumina ($Al_2O_3$) occupies a residual part. In the ceramic composition that uses the compound of additional element to enhance the binding force in the grain boundary and does not substantially contain any zirconium compound, it is preferable that tungsten carbide (WC) occupies a part of not lower than 20.0% by volume and not higher than 50.0% by volume, any of compounds of transition metals belonging to the groups 4 to 6 (except zirconium (Zr) and tungsten (W)) in the periodic table, yttrium compounds, scandium compounds and lanthanide compounds occupies a part not lower than 0.1% by volume and not higher than 1.0% by volume, and alumina ($Al_2O_3$) occupies a residual part. When the content of the compound of additional element exceeds 1.0% by volume, solid solution of the additional element in tungsten carbide (WC) deteriorates the properties of the ceramic composition. The compound of additional element herein means any of oxides of the additional element, carbides of the additional element, nitrides of the additional elements, carbonitrides of the additional elements and combinations thereof.

Table 3 below shows the results of evaluation tests with regard to the mechanical properties, the thermal properties and the durability of ceramic compositions of Sample Nos. 13 to 17 and SC15 to SC16. The examiner produced a plurality of samples 13, 14, 15, 16, 17, SC15 and SC16 as ceramic compositions and examined various properties of the respective samples in the same manner as the evaluation tests of Tables 1 and 2. The sample 13 is identical with the sample 1 of Tables 1 and 2 and includes zirconia powder as an additional component.

A sample 14 was a ceramic composition produced in the same manner as the sample 1 using 59.5% by volume of alumina powder, 40.0% by volume of tungsten carbide powder and 0.5% by volume of yttrium oxide ($Y_2O_3$) powder as the raw materials. The compound of additional element of the sample 14 was yttrium oxide ($Y_2O_3$) powder. In the sample 14, the yttrium oxide powder had the mean particle size of about 0.8 µm. In the sample 14, the element Y was distributed as an additional component element both in the first grain boundary 40 and in the second grain boundary 50. The area ratio $A/(A+B) \times 100$ of the sample 14 was 10.1%.

A sample 15 was a ceramic composition produced in the same manner as the sample 14, except that 0.5% by volume of niobium oxide ($Nb_2O_5$) powder was used as the compound of additional element. In the sample 15, the niobium oxide powder had the mean particle size of about 0.7 µm. In the sample 15, the element Nb was distributed as the additional component element both in the first grain boundary 40 and in the second grain boundary 50. The area ratio $A/(A+B) \times 100$ of the sample 15 was 9.2%.

A sample 16 was a ceramic composition produced in the same manner as the sample 14, except that 0.5% by volume of chromium oxide ($Cr_2O_3$) powder was used as the compound of additional element. In the sample 16, the chromium oxide powder had the mean particle size of about 1.1 µm. In the sample 16, the element Cr was distributed as the additional component element both in the first grain boundary 40 and in the second grain boundary 50. The area ratio $A/(A+B) \times 100$ of the sample 16 was 11.1%.

A sample 17 was a ceramic composition produced in the same manner as the sample 14, except that 0.25% by volume of zirconia powder and 0.25% by volume of yttrium oxide powder were used as the compounds of additional elements. In the sample 17, the zirconia powder had the mean particle size of about 0.7 µm, and the yttrium oxide powder had the mean particle size of about 0.7 μm. In the sample 17, the element Zr and the element Y were distributed as the additional component elements both in the first grain boundary 40 and in the second grain boundary 50. The area ratio A/(A+B)×100 of the sample 17 was 10.6%.

A sample SC 15 was a ceramic composition produced in the same manner as the sample 14, except that 0.5% by volume of iron oxide ($Fe_2O_3$) powder was used as the compound of additional element. In the sample SC15, the iron oxide powder had the mean particle size of about 0.9 μm. In the sample SC15, the element Fe was distributed as the additional component element neither in the first grain boundary 40 nor in the second grain boundary 50. This result may be attributed to failure of uniformly diffusing the element Fe in the grain boundary caused by segregation of the element Fe as a liquid phase during sintering and by reaction of the element Fe with another additional component to produce a compound. The area ratio A/(A+B)×100 of the sample SC15 was 10.0%.

A sample SC 16 was a ceramic composition produced in the same manner as the sample 14, except that 0.5% by volume of calcium oxide (CaO) powder was used as the compound of additional element. In the sample SC16, the calcium oxide powder had the mean particle size of about 1.1 μm. In the sample SC16, the element Ca was distributed as the additional component element neither in the first grain boundary 40 nor in the second grain boundary 50. This result may be attributed to failure of uniformly diffusing the element Ca in the grain boundary caused by segregation of the element Ca as a liquid phase during sintering and by reaction of the element Ca with another additional component to produce a compound. The area ratio A/(A+B)×100 of the sample SC16 was 10.0%.

In the samples 14 to 17, each selected additional component element was distributed both in the first grain boundary 40 and in the second grain boundary 50, like the sample 13. The samples 14 to 17 were equivalent to the sample 13 in basic properties (e.g., bending strength and fracture toughness). The cutting tests of the respective samples 14 to 17 accordingly had the good results like those of the sample 13.

In the samples SC15 and SC16, on the other hand, each selected additional component element was distributed neither in the first grain boundary 40 nor in the second grain boundary 50. The samples SC15 and SC16 had the bending strengths of not higher than two thirds of the bending strengths of the samples 13 to 17. The cutting tests of the samples SC15 and SC16 accordingly caused fractures at any cutting speeds.

According to the results of the evaluation tests of Table 3 below, in terms of improving the durability of the ceramic composition, it is preferable that at least one element selected from the group consisting of zirconium (Zr), the transition metals belonging to the groups 4 to 6 in the periodic table, yttrium (Y), scandium (Sc) and lanthanide series is distributed in the first grain boundary 40 and in the second grain boundary 50.

TABLE 3

| Sample | Composition $Al_2O_3$ vol % | WC vol % | Additional Component vol % | Particle size μm | Preliminary Pulverization P/NP* | Amount of Dispersant Added wt % | Sintering Temp °C. | Additional Component Element in Grain Boundary $Al_2O_3$/WC P/NP** | $Al_2O_3$/$Al_2O_3$ P/NP** | Area Ratio A/(A + B) × 100 % | Bending Strength span: 30 mm MPa |
|---|---|---|---|---|---|---|---|---|---|---|---|
| 13 | 55.0 | 40.0 | 5.0  $ZrO_2$ | 0.7 | P* | 2.0 | 1750 | P** | P** | 9.0 | 1810 |
| 14 | 59.5 | 40.0 | 0.5  $Y_2O_3$ | 0.8 | P* | 2.0 | 1750 | P** | P** | 10.1 | 1750 |
| 15 | 59.5 | 40.0 | 0.5  $Nb_2O_5$ | 0.7 | P* | 2.0 | 1750 | P** | P** | 9.2 | 1690 |
| 16 | 59.5 | 40.0 | 0.5  $Cr_2O_3$ | 1.1 | P* | 2.0 | 1750 | P** | P** | 11.1 | 1620 |
| 17 | 59.5 | 40.0 | 0.5  $ZrO_2$ 0.25  $Y_2O_3$ | 0.7 | P* | 2.0 | 1750 | P** P** | P** P** | 10.6 | 1760 |
| SC15 | 59.5 | 40.0 | 0.25  $Fe_2O_3$ | 0.7 | P* | 2.0 | 1750 | NP** | NP** | 10.0 | 1000 |
| SC16 | 59.5 | 40.0 | 0.5  CaO 0.5 | 0.9 1.1 | P* | 2.0 | 1750 | NP** | NP** | 10.0 | 950 |

| Sample | Fracture Toughness $K_{10}$ MPa·m$^{0.5}$ | Hardness Vickers GPa | Coefficient of Thermal Expansion at 600° C. ppm/K | Thermal Conductivity at room temperature W/(m·K) | Cutting Test 240 m/min 5 passes Cutting edge ○ > Δ > x | Abrasion loss ○ > Δ > x | Cutting Test 360 m/min 5 passes Cutting edge ○ > Δ > x | Abrasion loss ○ > Δ > x | Cutting Test 480 m/min 5 passes Cutting edge ○ > Δ > x | Abrasion loss ○ > Δ > x |
|---|---|---|---|---|---|---|---|---|---|---|
| 13 | 4.6 | 22.2 | 6.4 | 34.4 | ○ | ○ | ○ | ○ | ○ | ○ |
| 14 | 4.6 | 22.3 | 6.3 | 36.3 | ○ | ○ | ○ | ○ | ○ | ○ |
| 15 | 4.7 | 22.1 | 6.3 | 33.5 | ○ | ○ | ○ | ○ | ○ | ○ |

TABLE 3-continued

| | | | | | | | | | | |
|---|---|---|---|---|---|---|---|---|---|---|
| 16 | 4.6 | 22.5 | 6.2 | 34.5 | ○ | ○ | ○ | ○ | ○ | ○ |
| 17 | 4.6 | 22.3 | 6.1 | 36.5 | ○ | ○ | ○ | ○ | ○ | ○ |
| SC15 | 4.6 | 22.1 | 6.5 | 34.2 | x | x | x | x | x | x |
| SC16 | 4.3 | 22.2 | 6.6 | 34.8 | x | x | x | x | x | x |

P/NP*: *Performed/Not Performed
P*: *Performed
P/NP: Present/Not Present
P: Present
NP: Not Present Table 4 below shows the results of evaluation tests with regard to the mechanical properties, the thermal properties and the durability of ceramic compositions of Sample Nos. A to I and X. The examiner produced a plurality of samples A, B, C, D, E, F, G, H, I and X as ceramic compositions and examined various properties of the respective samples in the same manner as the evaluation tests of Tables 1 and 2 above.

A sample A was a ceramic composition produced in the same manner as the sample 1 using 59.0% by volume of alumina powder, 40.0% by volume of tungsten carbide powder and 1.0% by volume of zirconia powder as the raw materials. The compound of additional element of the sample A was zirconia powder. In the sample A, the zirconia powder had the mean particle size of about 0.7 μm. In the sample A, the element Zr was distributed as the additional component element both in the first grain boundary 40 and in the second grain boundary 50. The area ratio A/(A+B)×100 of the sample A was 8.6%.

A sample B was a ceramic composition produced in the same manner as the sample 1 using 58.3% by volume of alumina powder, 40.0% by volume of tungsten carbide powder and 1.7% by volume of zirconia powder as the raw materials. The compound of additional element of the sample B was zirconia powder. In the sample B, the zirconia powder had the mean particle size of about 0.7 μm. In the sample B, the element Zr was distributed as the additional component element both in the first grain boundary 40 and in the second grain boundary 50. The area ratio A/(A+B)×100 of the sample B was 8.6%.

A sample C was a ceramic composition produced in the same manner as the sample 1 using 50.0% by volume of alumina powder, 40.0% by volume of tungsten carbide powder and 10.0% by volume of zirconia powder as the raw materials. The compound of additional element of the sample C was zirconia powder. In the sample C, the zirconia powder had the mean particle size of about 0.7 μm. In the sample C, the element Zr was distributed as the additional component element both in the first grain boundary 40 and in the second grain boundary 50. The area ratio A/(A+B)×100 of the sample C was 9.3%.

A sample D was a ceramic composition produced in the same manner as the sample 1 using 59.5% by volume of alumina powder, 40.0% by volume of tungsten carbide powder and 0.5% by volume of titanium carbide (TiC) powder as the raw materials. The compound of additional element of the sample D was titanium carbide powder. In the sample D, the titanium carbide powder had the mean particle size of about 0.8 μm. In the sample D, the element titanium (Ti) was distributed as the additional component element both in the first grain boundary 40 and in the second grain boundary 50. The area ratio A/(A+B)×100 of the sample D was 10.3%.

A sample E was a ceramic composition produced in the same manner as the sample 1 using 59.5% by volume of alumina powder, 40.0% by volume of tungsten carbide powder and 0.5% by volume of vanadium carbide (VC) powder as the raw materials. The compound of additional element of the sample E was vanadium carbide powder. In the sample E, the vanadium carbide powder had the mean particle size of about 1.2 μm. In the sample E, the element vanadium (V) was distributed as the additional component element both in the first grain boundary 40 and in the second grain boundary 50. The area ratio A/(A+B)×100 of the sample E was 10.9%.

A sample F was a ceramic composition produced in the same manner as the sample 1 using 59.5% by volume of alumina powder, 40.0% by volume of tungsten carbide powder and 0.5% by volume of trichromium dicarbide ($Cr_3C_2$) powder as the raw materials. The compound of additional element of the sample F was trichromium dicarbide powder. In the sample F, the trichromium dicarbide powder had the mean particle size of about 1.0 μm. In the sample F, the element chromium (Cr) was distributed as the additional component element both in the first grain boundary 40 and in the second grain boundary 50. The area ratio A/(A+B)×100 of the sample F was 12.0%.

A sample G was a ceramic composition produced in the same manner as the sample 1 using 59.5% by volume of alumina powder, 40.0% by volume of tungsten carbide powder and 0.5% by volume of zirconium carbide (ZrC) powder as the raw materials. The compound of additional element of the sample G was zirconium carbide powder. In the sample G, the zirconium carbide powder had the mean particle size of about 1.1 μm. In the sample G, the element zirconium (Zr) was distributed as the additional component element both in the first grain boundary 40 and in the second grain boundary 50. The area ratio A/(A+B)×100 of the sample G was 10.5%.

A sample H was a ceramic composition produced in the same manner as the sample 1 using 59.5% by volume of alumina powder, 40.0% by volume of tungsten carbide powder and 0.5% by volume of niobium carbide (NbC) powder as the raw materials. The compound of additional element of the sample H was niobium carbide powder. In the sample H, the titanium carbide powder had the mean particle size of about 1.0 μm. In the sample H, the element niobium (Nb) was distributed as the additional component element both in the first grain boundary 40 and in the second grain boundary 50. The area ratio A/(A+B)×100 of the sample H was 11.3%.

A sample I was a ceramic composition produced in the same manner as the sample H, except that 0.25% by volume of zirconia ($ZrO_2$) powder and 0.25% by volume of zirconium carbide (ZrC) powder were used as the compounds of additional element. In the sample I, the zirconia powder had the mean particle size of about 0.7 μm, and the zirconium carbide powder had the mean particle size of about 1.1 μm. In the sample I, the element zirconium (Zr) was distributed as the additional component element both in the first grain boundary 40 and in the second grain boundary 50. The area ratio A/(A+B)×100 of the sample I was 9.9%.

A sample X was a ceramic composition produced in the same manner as the sample H, except that 0.5% by volume of magnesium oxide (MgO) powder was used as the compound of additional element. In the sample X, the magnesium oxide powder had the mean particle size of about 0.8 μm. In the sample X, the element magnesium (Mg) was distributed as the additional component element both in the first grain boundary 40 and in the second grain boundary 50. The area ratio A/(A+B)×100 of the sample X was 9.6%.

The cutting tests of the respective samples A to I had the good results at any cutting speeds. The cutting test of the sample X caused fracture at any cutting speeds.

According to the evaluation results of the samples 1 to 12 and the samples A, B and C, in terms of providing the fracture resistance, the content of zirconia ($ZrO_2$) as the additional component is more preferably not lower than 1.0% by volume and not higher than 15.0% by volume and is furthermore preferably not lower than 1.7% by volume and not higher than 10.0% by volume.

At least part of the zirconia crystal grains 30 in the ceramic composition may be zirconium carbide (ZrC) converted from zirconia ($ZrO_2$) by carbonization or may be a solid solution of $ZrO_2$ and ZrC. In other words, the ceramic

TABLE 4

| Sample | Composition $Al_2O_3$ vol % | WC vol % | Additional Component vol % | Additional Component Particle size μm | Preliminary Pulverization P/NP* | Amount of Dispersant Added wt % | Sintering Temp °C. | Element in Grain Boundary $Al_2O_3$/WC P/NP** | Element in Grain Boundary $Al_2O_3$/$Al_2O_3$ P/NP** | Area Ratio A/(A + B) × 100 % | Bending Strength span: 30 mm MPa |
|---|---|---|---|---|---|---|---|---|---|---|---|
| A | 59.0 | 40.0 | $ZrO_2$ | | P* | 2.0 | 1750 | P** | P** | 8.6 | 1650 |
| B | 58.3 | 40.0 | 1.0 $ZrO_2$ | 0.7 | P* | 2.0 | 1750 | P** | P** | 8.6 | 1720 |
| C | 50.0 | 40.0 | 1.7 $ZrO_2$ | 0.7 | P* | 2.0 | 1750 | P** | P** | 9.3 | 1850 |
| D | 59.5 | 40.0 | 10.0 TiC | 0.7 | P* | 2.0 | 1750 | P** | P** | 10.3 | 1650 |
| E | 59.5 | 40.0 | 0.5 VC | 0.8 | P* | 2.0 | 1750 | P** | P** | 10.9 | 1690 |
| F | 59.5 | 40.0 | 0.5 $Cr_3C_2$ | 1.2 | P* | 2.0 | 1750 | P** | P** | 12.0 | 1660 |
| G | 59.5 | 40.0 | 0.5 CaO | 1.0 | P* | 2.0 | 1750 | P** | P** | 10.5 | 1690 |
| H | 59.5 | 40.0 | 0.5 NbC | 1.1 | P* | 2.0 | 1750 | P** | P** | 11.3 | 1670 |
| I | 59.5 | 40.0 | 0.5 $ZrO_2$ / 0.25 ZrC | 1.0 / 0.7 | P* | 2.0 | 1750 | P** | P** | 9.9 | 1700 |
| X | 59.5 | 40.0 | 0.25 MgO / 0.5 | 1.1 / 0.8 | P* | 2.0 | 1750 | P** | P** | 9.6 | 1070 |

| Sample | Fracture Toughness $K_{10}$ MPa·$m^{0.5}$ | Hardness Vickers GPa | Coefficient of Thermal Expansion at 600° C. ppm/K | Thermal Conductivity at room temperature W/(m·K) | Cutting Test 240 m/min 5 passes Cutting edge o>Δ>x | Cutting Test 240 m/min 5 passes Abrasion loss o>Δ>x | Cutting Test 360 m/min 5 passes Cutting edge o>Δ>x | Cutting Test 360 m/min 5 passes Abrasion loss o>Δ>x | Cutting Test 480 m/min 5 passes Cutting edge o>Δ>x | Cutting Test 480 m/min 5 passes Abrasion loss o>Δ>x |
|---|---|---|---|---|---|---|---|---|---|---|
| A | 4.4 | 22.7 | 6.3 | 34.7 | o | o | o | o | o | o |
| B | 4.5 | 22.8 | 6.3 | 34.7 | o | o | o | o | o | o |
| C | 4.7 | 21.5 | 6.6 | 33.5 | o | o | o | o | o | o |
| D | 4.6 | 22.2 | 6.4 | 34.3 | o | o | o | o | o | o |
| E | 4.6 | 22.6 | 6.4 | 33.6 | o | o | o | o | o | o |
| F | 4.6 | 22.4 | 6.3 | 34.0 | o | o | o | o | o | o |
| G | 4.7 | 22.5 | 6.5 | 33.6 | o | o | o | o | o | o |
| H | 4.7 | 22.1 | 6.4 | 33.8 | o | o | o | o | o | o |
| I | 4.6 | 22.4 | 6.5 | 33.2 | o | o | o | o | o | o |
| J | 4.6 | 22.1 | 6.5 | 33.7 | x | x | x | x | x | x |

P/NP*: *Performed/Not Performed
P*: *Performed
P/NP: Present/Not Present
P: Present composition may be mainly composed of alumina ($Al_2O_3$), tungsten carbide (WC) and a zirconium compound (for example, at least one of $ZrO_2$ and ZrC).

What is claimed is:

1. A ceramic composition mainly composed of alumina ($Al_2O_3$), tungsten carbide (WC) and at least one compound selected from the group consisting of compounds of transition metals (except tungsten (W)) belonging to groups 4 to 6 in a periodic table, yttrium compounds, scandium compounds and lanthanide compounds,
    wherein at least one element selected from the group consisting of transition metals (except tungsten (W)) belonging to the groups 4 to 6 in the periodic table, yttrium (Y), scandium (Sc) and lanthanide series is distributed in a first grain boundary as an interface where an alumina ($Al_2O_3$) crystal grain is adjacent to a tungsten carbide (WC) crystal grain and in a second grain boundary as an interface where two alumina ($Al_2O_3$) crystal grains are adjacent to each other.

2. The ceramic composition according to claim 1, wherein on a cross section of the ceramic composition, a relationship between a cross sectional area A of a tungsten carbide (WC) crystal grain which is not adjacent to another tungsten carbide (WC) crystal grain but is surrounded by at least one type of crystal grain selected from the group consisting of alumina ($Al_2O_3$), the compounds of transition metals belonging to the groups 4 to 6 (except tungsten (W)) in the periodic table, the yttrium compounds, the scandium compounds and the lanthanide compounds and a cross sectional area B of a tungsten carbide (WC) crystal grain adjacent to another tungsten carbide (WC) crystal grain satisfies $1.5 \leq A/(A+B) \times 100 \leq 50.0$.

3. The ceramic composition according to claim 1, wherein
    tungsten carbide (WC) occupies a part of not lower than 20.0% by volume and not higher than 50.0% by volume,
    a zirconium compound occupies a part of not lower than 0.1% by volume and not higher than 18.0% by volume, and
    alumina ($Al_2O_3$) occupies a residual part.

4. The ceramic composition according to claim 1, wherein
    tungsten carbide (WC) occupies a part of not lower than 20.0% by volume and not higher than 50.0% by volume,
    a zirconium compound occupies a part of not lower than 0.1% by volume and not higher than 18.0% by volume,
    any of the compounds of transition metals belonging to the groups 4 to 6 (except zirconium (Zr) and tungsten (W)) in the periodic table, the yttrium compounds, the scandium compounds and the lanthanide compounds occupies a part of not lower than 0.1% by volume and not higher than 1.0% by volume, and
    alumina ($Al_2O_3$) occupies a residual part.

5. The ceramic composition according to claim 1, wherein
    tungsten carbide (WC) occupies a part of not lower than 20.0% by volume and not higher than 50.0% by volume,
    any of the compounds of transition metals belonging to the groups 4 to 6 (except zirconium (Zr) and tungsten (W)) in the periodic table, the yttrium compounds, the scandium compounds and the lanthanide compounds occupies a part of not lower than 0.1% by volume and not higher than 1.0% by volume, and
    alumina ($Al_2O_3$) occupies a residual part.

6. A cutting tool made of the ceramic composition according to claim 1.

* * * * *